United States Patent
Damnjanovic et al.

(10) Patent No.: US 12,167,248 B2
(45) Date of Patent: Dec. 10, 2024

(54) INTERFERENCE COORDINATION IN LICENSED SHARED RADIO FREQUENCY SPECTRUM

(71) Applicant: QUALCOMM Incorporated, San Diego, CA (US)

(72) Inventors: Aleksandar Damnjanovic, Del Mar, CA (US); Andrei Dragos Radulescu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 17/143,661

(22) Filed: Jan. 7, 2021

(65) Prior Publication Data

US 2021/0211886 A1  Jul. 8, 2021

Related U.S. Application Data

(60) Provisional application No. 62/958,542, filed on Jan. 8, 2020.

(51) Int. Cl.
*H04W 16/14* (2009.01)
*H04B 17/318* (2015.01)
(Continued)

(52) U.S. Cl.
CPC .......... *H04W 16/14* (2013.01); *H04B 17/318* (2015.01); *H04B 17/336* (2015.01);
(Continued)

(58) Field of Classification Search
CPC ..... H04W 16/14; H04W 24/10; H04W 76/11; H04B 17/318; H04B 17/336; H04L 5/0048
See application file for complete search history.

(56) References Cited

U.S. PATENT DOCUMENTS 10,405,190 B2 * 9/2019 Khoshnevisan .. H04W 72/0453
2018/0206214 A1 * 7/2018 Bendlin ................ H04L 5/0053
(Continued)

FOREIGN PATENT DOCUMENTS

WO     WO-2021137744 A1 *  7/2021

OTHER PUBLICATIONS

Jeon et al., "Coordinated Dynamic Spectrum Sharing for 5G and Beyond Cellular Networks", Aug. 9, 2019, IEEE (Year: 2019).*

*Primary Examiner* — Justin T Van Roie
(74) *Attorney, Agent, or Firm* — Holland & Hart LLP/Qualcomm Incorporated

(57) ABSTRACT

Methods, systems, and devices for wireless communications are described in which wireless nodes may use licensed shared radio frequency spectrum band for communications and one or more neighboring networks may use a same licensed shared radio frequency spectrum band. A second network of the one or more neighboring networks may have priority of use of the licensed shared radio frequency spectrum band within a particular geographic area. Disclosed techniques provide that nodes of each network may indicate an identification of the network, a network priority, or both, in over-the-air signaling. Wireless nodes may determine if another neighboring network is present based on the over-the-air signaling, may determine whether the other network has a higher priority, and may adjust one or more transmissions in the event that a higher priority network is identified, such as through reducing transmission power.

30 Claims, 22 Drawing Sheets

(51) Int. Cl.
*H04B 17/336* (2015.01)
*H04L 5/00* (2006.01)
*H04W 24/10* (2009.01)
*H04W 76/11* (2018.01)

(52) U.S. Cl.
CPC .......... *H04L 5/0048* (2013.01); *H04W 24/10* (2013.01); *H04W 76/11* (2018.02)

(56) References Cited

U.S. PATENT DOCUMENTS

| | | | |
|---|---|---|---|
| 2019/0327765 A1* | 10/2019 | Mukherjee | H04W 16/14 |
| 2020/0128472 A1* | 4/2020 | Jayawickrama | H04W 52/367 |
| 2020/0221305 A1* | 7/2020 | Jeon | H04W 72/082 |
| 2020/0221307 A1* | 7/2020 | Jeon | H04W 16/14 |
| 2020/0259896 A1* | 8/2020 | Sachs | H04L 67/51 |
| 2021/0119748 A1* | 4/2021 | Damnjanovic | H04L 5/0048 |

* cited by examiner

INTERFERENCE COORDINATION IN LICENSED SHARED RADIO FREQUENCY SPECTRUM

CROSS REFERENCE

The present Application for Patent claims the benefit of U.S. Provisional Patent Application No. 62/958,542 by DAMNJANOVIC et al., entitled "INTERFERENCE COORDINATION IN LICENSED SHARED RADIO FREQUENCY SPECTRUM," filed Jan. 8, 2020, assigned to the assignee hereof, and expressly incorporated herein.

FIELD OF TECHNOLOGY

The following relates generally to wireless communications and more specifically to interference coordination in licensed shared radio frequency spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support interference coordination in licensed shared radio frequency spectrum. In accordance with various techniques, a user equipment (UE) and a base station of a first network may use licensed shared radio frequency spectrum band for communications and one or more neighboring networks may use a same licensed shared radio frequency spectrum band, where a second network of the one or more neighboring networks has priority of use of the licensed shared radio frequency spectrum band within a particular geographic area. In some cases, nodes of each network may provide an identification of the network, a network priority, or both, in over-the-air signaling (e.g., in one or more reference signal transmissions). UEs, base stations, and other wireless nodes may determine if another neighboring network is present based on the over-the-air signaling, may determine whether the other network has a higher priority, and may adjust one or more transmissions (e.g., by reducing a transmission power or refraining from transmitting) in the event that a higher priority network is identified. In some cases, different networks may have different priorities in different time-domain resources, and a transmitting node may reduce transmission power in time-domain resources in which another network has higher priority. In some cases, a transmitting node may perform a listen-before-talk (LBT) procedure and adjust an associated transmission based on whether a channel is being used by a higher priority node.

A method of wireless communication at a first node of a first network is described. The method may include receiving configuration information for communicating with a second node of the first network via a shared radio frequency spectrum band, the configuration information including a network identification of the first network and a first priority of the first network relative to one or more other priorities of one or more other networks, measuring a received signal strength of one or more other wireless nodes of the one or more other networks, and transmitting one or more communications to the second node at a transmission power, wherein the transmission power is determined based on the received signal strength of the one or more other wireless nodes and the first priority of the first network.

An apparatus for wireless communication at a first node of a first network is described. The apparatus may include a processor, memory coupled with the processor, and instructions stored in the memory. The instructions may be executable by the processor to cause the apparatus to receive configuration information for communicating with a second node of the first network via a shared radio frequency spectrum band, the configuration information including a network identification of the first network and a first priority of the first network relative to one or more other priorities of one or more other networks, measure a received signal strength of one or more other wireless nodes of the one or more other networks, and transmit one or more communications to the second node at a transmission power, wherein the transmission power is determined based on the received signal strength of the one or more other wireless nodes and the first priority of the first network.

Another apparatus for wireless communication at a first node of a first network is described. The apparatus may include means for receiving configuration information for communicating with a second node of the first network via a shared radio frequency spectrum band, the configuration information including a network identification of the first network and a first priority of the first network relative to one or more other priorities of one or more other networks, measuring a received signal strength of one or more other wireless nodes of the one or more other networks, and transmit one or more communications to the second node at a transmission power, wherein the transmission power is determined based on the received signal strength of the one or more other wireless nodes and the first priority of the first network.

A non-transitory computer-readable medium storing code for wireless communication at a first node of a first network is described. The code may include instructions executable by a processor to receive configuration information for communicating with a second node of the first network via a shared radio frequency spectrum band, the configuration information including a network identification of the first network and a first priority of the first network relative to one or more other priorities of one or more other networks, measure a received signal strength of one or more other wireless nodes of the one or more other networks, and transmit one or more communications to the second node at a transmission power, wherein the transmission power is determined based on the received signal strength of the one or more other wireless nodes and the first priority of the first network.

In some examples of the method, apparatuses, and non-transitory computer-readable medium described herein, the determining the transmission power further may include operations, features, means, or instructions for determining a service priority of a data channel to be transmitted to the second node, and where the transmission power may be further determined based on the service priority relative to a set of service priorities.

In some examples of the method, apparatuses, and non-transitory computer-readable medium described herein, the first node may be one of a UE, a base station, an access point (AP), or a station (STA), and the second node may be one of a UE, a base station, an AP, or a STA.

In some examples of the method, apparatuses, and non-transitory computer-readable medium described herein, the configuration information includes a first network identity of the first network that may be indicated in one or more reference signals transmitted from nodes of the first network, and the method may further include identifying at least a first reference signal of the second node based on the first network identity indicated in the first reference signal, and identifying at least a second reference signal of a second network associated with one or more of the other wireless nodes based on a second network identity indicated in the second reference signal. In some examples of the method, apparatuses, and non-transitory computer-readable medium described herein the one or more reference signals include one or more of a remote interference management reference signal (RIM-RS) or a sounding reference signal (SRS).

Some examples of the method, apparatuses, and non-transitory computer-readable medium described herein may further include operations, features, means, or instructions for determining that the second network has a higher priority than the first network based on one or more of the first network identity or the second network identity, determining that a signal strength of the second reference signal exceeds a threshold value, and reducing the transmission power for the one or more communications by a set amount based on the signal strength of the second reference signal and the higher priority of the second network. Some examples of the method, apparatuses, and non-transitory computer-readable medium described herein may further include operations, features, means, or instructions for refraining from transmitting communications via the shared radio frequency spectrum band when the signal strength of the second reference signal exceeds a set limit.

Some examples of the method, apparatuses, and non-transitory computer-readable medium described herein may further include operations, features, means, or instructions for identifying a set of signal strength thresholds, where the reducing the transmission power for the one or more communications is based on the signal strength of the second reference signal relative to the set of signal strength thresholds.

In some examples of the method, apparatuses, and non-transitory computer-readable medium described herein, the determining the transmission power further may include operations, features, means, or instructions for determining that a second network has a higher priority than the first network and has a first carrier frequency, reducing the transmission power for the one or more communications by a first reduction amount for communications in a first frequency band that at least partially overlaps the first carrier frequency, reducing the transmission power for the one or more communications by a second reduction amount for communications in a second frequency band that is adjacent to the first carrier frequency, and maintaining a nominal transmission power for the one or more communications in a third frequency band that is outside of a set range of the first carrier frequency.

In some examples of the method, apparatuses, and non-transitory computer-readable medium described herein, the first priority may be determined based on a priority configuration provided by a coexistence manager associated with the first network and the one or more other networks. In some examples of the method, apparatuses, and non-transitory computer-readable medium described herein, the configuration information further indicates a maximum allowed interference of the one or more other networks, where the transmission power may be further determined based on the maximum allowed interference of the one or more other networks. In some examples of the method, apparatuses, and non-transitory computer-readable medium described herein, the configuration information further indicates synchronization information for frame synchronization among the first network and the one or more other networks. In some examples of the method, apparatuses, and non-transitory computer-readable medium described herein, the first priority relative to the one or more other priorities of the one or more other networks may be based on one or more of time resources or frequency resources, and where the time resources may be determined based on the synchronization information.

In some examples of the method, apparatuses, and non-transitory computer-readable medium described herein, the transmission power for the one or more communications may be reduced for time resources, frequency resources, or combinations thereof, in which the one or more other networks have higher priority than the first network, and the transmission power for the one or more communications may be maintained at a nominal level for time resources, frequency resources, or combinations thereof, in which the first network has higher priority than the one or more other networks.

In some examples of the method, apparatuses, and non-transitory computer-readable medium described herein, the determining the transmission power for the one or more communications further may include operations, features, means, or instructions for determining that the received signal strength of the one or more other wireless nodes of the one or more other networks is below a threshold value or that a reservation signal from the one or more other networks is undetected, and maintaining a nominal transmission power for the one or more communications irrespective of the first priority relative to the one or more other priorities.

A method of wireless communication at a second node of a first network is described. The method may include identifying configuration information for communications with at least a first node of the first network via a shared radio frequency spectrum band, the configuration information including a network identification of the first network and a first priority of the first network relative to one or more other priorities of one or more other networks, measuring a received signal strength of one or more other wireless nodes of the one or more other networks, and transmitting one or more communications to the first node at a transmission power, wherein the transmission power is determined based on the received signal strength of the one or more other wireless nodes and the first priority of the first network.

An apparatus for wireless communication at a second node of a first network is described. The apparatus may include a processor, memory coupled with the processor, and instructions stored in the memory. The instructions may be executable by the processor to cause the apparatus to identify configuration information for communications with at least a first node of the first network via a shared radio frequency spectrum band, the configuration information including a network identification of the first network and a first priority of the first network relative to one or more other priorities of one or more other networks, measure a received signal strength of one or more other wireless nodes of the one or more other networks, and transmit one or more communications to the first node at a transmission power, wherein the transmission power is determined based on the received signal strength of the one or more other wireless nodes and the first priority of the first network.

Another apparatus for wireless communication at a second node of a first network is described. The apparatus may include means for identifying configuration information for communications with at least a first node of the first network via a shared radio frequency spectrum band, the configuration information including a network identification of the first network and a first priority of the first network relative to one or more other priorities of one or more other networks, measuring a received signal strength of one or more other wireless nodes of the one or more other networks, and transmit one or more communications to the first node at a transmission power, wherein the transmission power is determined based on the received signal strength of the one or more other wireless nodes and the first priority of the first network.

A non-transitory computer-readable medium storing code for wireless communication at a second node of a first network is described. The code may include instructions executable by a processor to identify configuration information for communications with at least a first node of the first network via a shared radio frequency spectrum band, the configuration information including a network identification of the first network and a first priority of the first network relative to one or more other priorities of one or more other networks, measure a received signal strength of one or more other wireless nodes of the one or more other networks, and transmit one or more communications to the first node at a transmission power, wherein the transmission power is determined based on the received signal strength of the one or more other wireless nodes and the first priority of the first network.

In some examples of the method, apparatuses, and non-transitory computer-readable medium described herein, the first node may be one of a UE, a base station, an AP, or a STA, and the second node is one of a UE, a base station, an AP, or a STA.

Some examples of the method, apparatuses, and non-transitory computer-readable medium described herein may further include operations, features, means, or instructions for transmitting configuration information to the first node that indicates the first priority of the first network for use in determining a communication power for communications from the first node. In some examples of the method, apparatuses, and non-transitory computer-readable medium described herein, the configuration information further indicates a maximum allowed interference of the one or more other networks, and the communication power may be further determined based on the maximum allowed interference of the one or more other networks.

In some examples of the method, apparatuses, and non-transitory computer-readable medium described herein, the determining the transmission power further may include operations, features, means, or instructions for determining a service priority of a data channel to be transmitted to the first node, and the transmission power may be further determined based on the service priority relative to a set of service priorities.

Some examples of the method, apparatuses, and non-transitory computer-readable medium described herein may further include operations, features, means, or instructions for configuring the first node to indicate a first network identity of the first network in one or more reference signals transmitted by the first node, identifying at least a first reference signal of the first node based on the first network identity indicated in the first reference signal, and identifying at least a second reference signal of a second network associated with one or more of the other wireless nodes based on a second network identity indicated in the second reference signal received at the first node. In some examples of the method, apparatuses, and non-transitory computer-readable medium described herein the one or more reference signals include one or more of a remote interference management reference signal (RIM-RS) or an SRS.

Some examples of the method, apparatuses, and non-transitory computer-readable medium described herein may further include operations, features, means, or instructions for determining that the second network has a higher priority than the first network based on one or more of the first network identity or the second network identity, determining that a signal strength of the second reference signal exceeds a threshold value, and reducing the transmission power for the one or more downlink communications by a set amount based on the signal strength of the second reference signal and the higher priority of the second network. Some examples of the method, apparatuses, and non-transitory computer-readable medium described herein may further include operations, features, means, or instructions for refraining from transmitting downlink communications via the shared radio frequency spectrum band when the signal strength of the second reference signal exceeds a set limit.

Some examples of the method, apparatuses, and non-transitory computer-readable medium described herein may further include operations, features, means, or instructions for identifying a set of signal strength thresholds, where the reducing the transmission power for the one or more communications is based on the signal strength of the second reference signal relative to the set of signal strength thresholds.

In some examples of the method, apparatuses, and non-transitory computer-readable medium described herein, the determining the transmission power further may include operations, features, means, or instructions for determining that a second network has a higher priority than the first network and has a first carrier frequency, reducing the transmission power for the one or more communications by a first reduction amount for communications in a first frequency band that at least partially overlaps the first carrier frequency, reducing the transmission power for the one or more communications by a second reduction amount for communications in a second frequency band that is adjacent to the first carrier frequency, and maintaining a nominal transmission power for the one or more communications in a third frequency band that is outside of a set range of the first carrier frequency.

In some examples of the method, apparatuses, and non-transitory computer-readable medium described herein, the first priority may be determined based on a priority configuration provided by a coexistence manager associated with the first network and the one or more other networks.

In some examples of the method, apparatuses, and non-transitory computer-readable medium described herein, the priority configuration provided by the coexistence manager further indicates a maximum allowed interference of the one or more other networks, and where the transmission power for the one or more downlink communications may be further determined based on the maximum allowed interference of the one or more other networks. In some examples of the method, apparatuses, and non-transitory computer-readable medium described herein, the configuration information further indicates synchronization information for frame synchronization among the first network and the one or more other networks. In some examples of the method, apparatuses, and non-transitory computer-readable medium described herein, the first priority relative to the one or more other priorities of the one or more other networks may be based on one or more of time resources or frequency resources, and where the time resources may be determined based on the synchronization information.

In some examples of the method, apparatuses, and non-transitory computer-readable medium described herein, the transmission power for the one or more communications may be reduced for time resources, frequency resources, or combinations thereof, in which the one or more other networks have higher priority than the first network, and the transmission power for the one or more communications may be maintained at a nominal level for time resources, frequency resources, or combinations thereof, in which the first network has higher priority than the one or more other networks.

In some examples of the method, apparatuses, and non-transitory computer-readable medium described herein, the determining the transmission power for the one or more communications further may include operations, features, means, or instructions for determining that the received signal strength of the one or more other wireless nodes of the one or more other networks is below a threshold value or that a reservation signal from the one or more other networks is undetected, and maintaining a nominal transmission power for the one or more communications irrespective of the first priority relative to the one or more other priorities.

DETAILED DESCRIPTION

Figure 1:
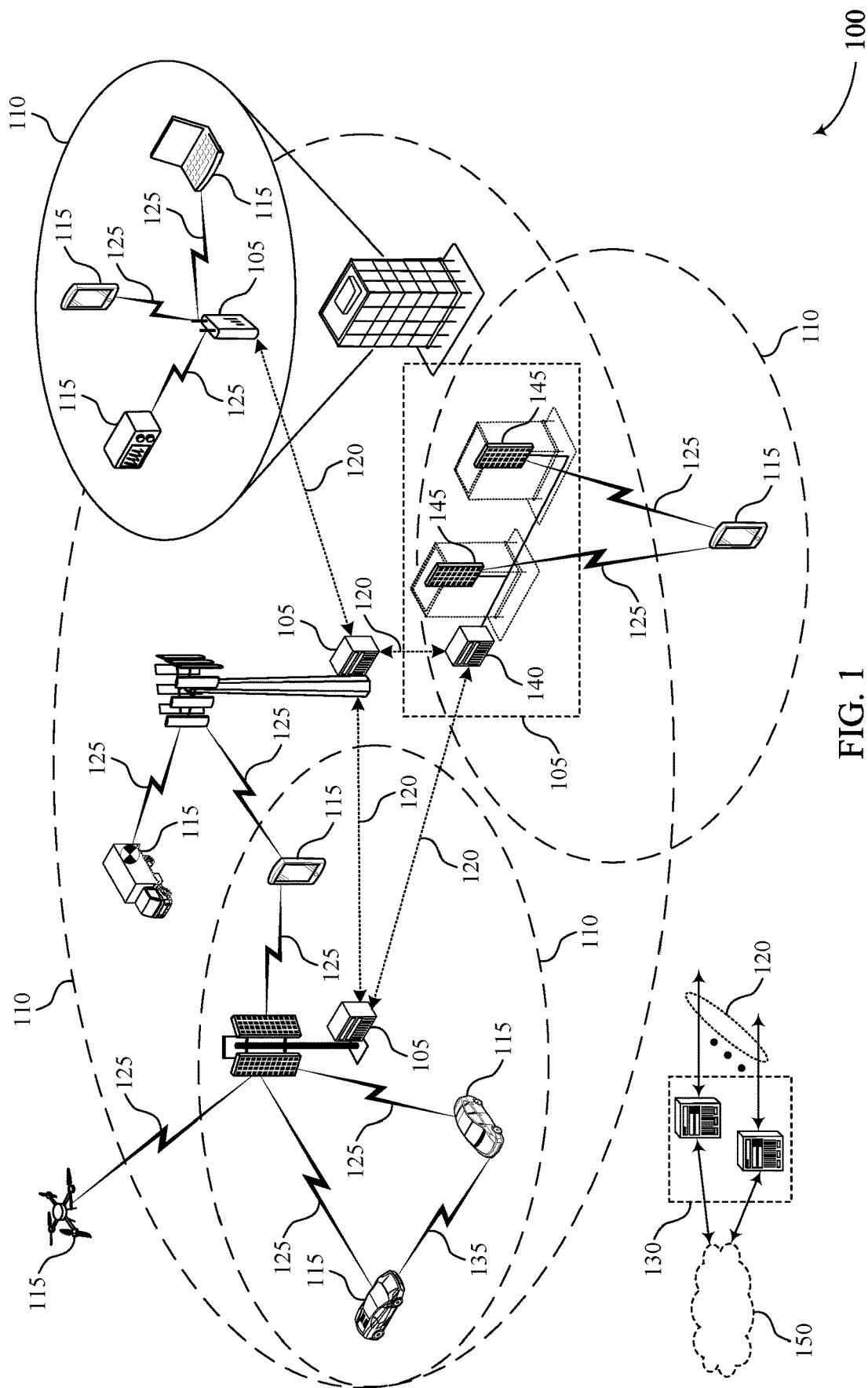
FIG. 1 illustrates an example of a system for wireless communications that supports interference coordination in licensed shared radio frequency spectrum in accordance with aspects of the present disclosure.

Various aspects of the present disclosure are directed to wireless network deployments in which different networks may operate using licensed shared radio frequency spectrum, where the different networks may have differing priorities of access to the licensed shared radio frequency spectrum. In accordance with various described techniques, a user equipment (UE), base station, or other wireless node of a lower priority network may adjust one or more transmissions upon detection of a higher priority network using the licensed shared radio frequency spectrum to reduce potential interference from the lower priority network. In some cases, a UE and a base station of a first network may use a same licensed shared radio frequency spectrum band as a second network that has priority of use of the licensed shared radio frequency spectrum band within a particular geographic area. In some cases, nodes of each network may provide an identification of the network, a network priority, or both, in over-the-air signaling (e.g., in one or more reference signal transmissions). UEs, base stations, or other wireless nodes (e.g., WiFi stations (STAs) or access points (APs)) may determine if another neighboring network is present based on the over-the-air signaling, may determine whether the other network has a higher priority, and may adjust one or more transmissions (e.g., by reducing a transmission power or refraining from transmitting) in the event that a higher priority network is identified. In some cases, different networks may have different priorities in different time-domain resources, and a transmitting node may reduce transmission power in time-domain resources in which another network has higher priority. In some cases, a transmitting node may perform a listen-before-talk (LBT) procedure and adjust an associated transmission based on whether a channel is being used by a higher priority node.

Such techniques may be implemented in cases where licensed shared radio frequency spectrum may be allocated (e.g., by a regulatory authority) to different operators in different locations, where each operator has priority for transmissions in their corresponding location. For example, a local operator may obtain a license for shared radio frequency spectrum access for a factory or building in a first geographic location, and a regional operator may have a license to use the shared radio frequency spectrum outside of the area(s) designated for the local operator. In some cases, a centralized coexistence manager may provide information to each of the networks using the licensed shared radio frequency spectrum related to areas of operation (e.g., in a database of license holders). However, such a database-based approach relies on relatively precise network locations and accurate channel models to ensure a higher priority operator does not receive interference in its operating area from a lower priority operator, and in some cases a relatively large margin may be provided to safeguard against potential interference. Such techniques may thus cause relatively inefficient usage of the shared radio frequency spectrum resource, as relatively large areas may not be utilized by any operators. In accordance with techniques as discussed herein, efficient usage of the shared radio frequency spectrum resource may be enhanced through over-the-air signaling that indicates a network identification, a priority of the network, or any combinations thereof.

In some cases, priority rules may be applied by nodes of different operators to avoid transmitting interfering signals that may interfere with another operator of another network that has priority for using the shared radio frequency spectrum in an area. In some cases, a network identification and associated priority of a network may be provided based on an assigned color of the operator (e.g., provided by a coexistence manager), and different colors may have different priorities. In some cases, a transmitting node may transmit a reference signal (e.g., a remote interference management reference signal (RIM-RS) or a sounding reference signal (SRS)) that indicates one or more of the network identification or network priority (e.g., color). Another node that is seeking to transmit may measure received reference signals (e.g., RIM-RS or SRS) and if a signal from another network is detected, a priority of the other network is determined based on the network ID, indicated priority, or color, indicated by the associated reference signal. The node that is seeking to transmit may reduce transmission power, or refrain from transmitting, if the other detected network has a higher priority. The node may transmit at a nominal transmission power if the other network has a lower priority. In some cases, different networks may have different priorities in different time-domain resources, and a transmitting node of a first network may reduce transmission power in time-domain resources in which another network has higher priority and maintain a nominal transmit power in time-domain resources in which the first network has higher priority. In some cases, a transmitting node may perform a listen-before-talk (LBT) procedure (e.g., a clear channel assessment (CCA)) and adjust an associated transmission based on whether a channel is being used by a higher priority node.

Such techniques may thus provide for enhanced usage of licensed shared radio frequency spectrum resources by allowing multiple adjacent networks to utilize the resources. Further, such techniques may enhance reliability of communications in licensed shared radio frequency spectrum by power reductions for lower priority transmissions and corresponding reduced interference that may be present at a higher priority node. Additionally, in some cases different services may have different priorities (e.g., high-reliability and low-latency services may have higher priority than enhanced mobile broadband (eMBB) services), which may enhance the reliability of the higher priority services.

Aspects of the disclosure are initially described in the context of wireless communications systems. Various examples of power management techniques in neighboring networks are then discussed. Aspects of the disclosure are further illustrated by and described with reference to apparatus diagrams, system diagrams, and flowcharts that relate to interference coordination in licensed shared radio frequency spectrum.

FIG. 1 illustrates an example of a wireless communications system 100 that supports interference coordination in licensed shared radio frequency spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed, licensed shared radio frequency spectrum) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. In some cases, synchronous operation may extend to one or more nodes of an adjacent wireless network to provide aligned frame timings. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples. In some cases, wireless communications system 100 may utilize licensed shared radio frequency spectrum, in which priority access to a particular radio frequency spectrum band is licensed to different operators for different geographic areas.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, UEs 115 and base stations 105 may use licensed shared radio frequency spectrum band for communications and one or more neighboring networks may use a same licensed shared radio frequency spectrum band, where a second network of the one or more neighboring networks has priority of use of the licensed shared radio frequency spectrum band within a particular geographic area. In some cases, nodes of each network may provide an identification of the network, a network priority, or both, in over-the-air signaling (e.g., in one or more reference signal transmissions). UEs 115 or base stations 105 may determine if another neighboring network is present based on the over-the-air signaling, may determine whether the other network has a higher priority, and may adjust one or more transmissions (e.g., by reducing a transmission power or refraining from transmitting) in the event that a higher priority network is identified. In some cases, different networks may have different priorities in different time-domain resources, and a transmitting node may reduce transmission power in time-domain resources in which another network has higher priority. In some cases, a transmitting node may perform an LBT procedure (e.g., a CCA) and adjust an associated transmission based on whether a channel is being used by a higher priority node.

Figure 2:
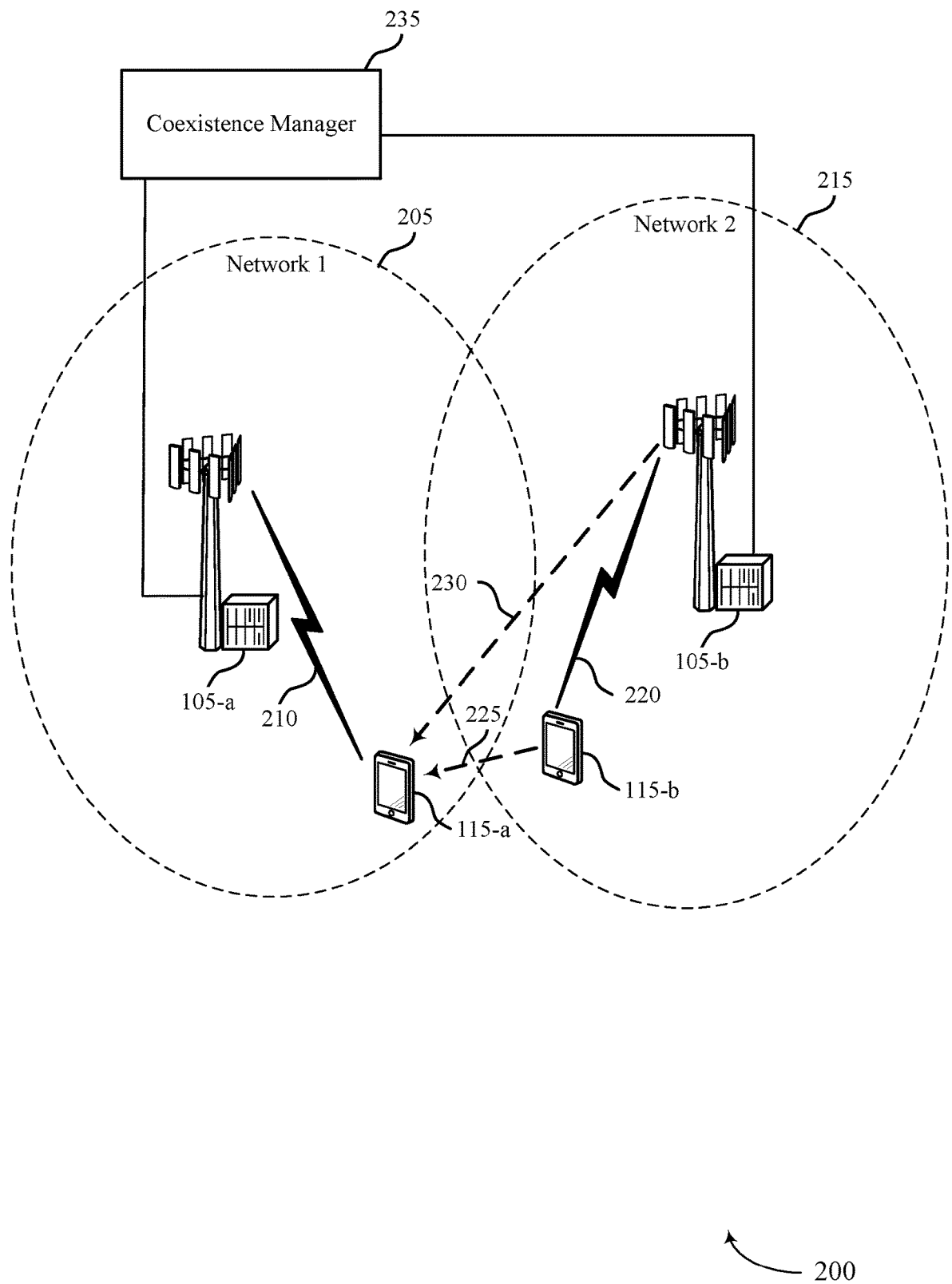
FIG. 2 illustrates an example of neighboring wireless communication systems that support interference coordination in licensed shared radio frequency spectrum in accordance with aspects of the present disclosure.

FIG. 2 illustrates an example of neighboring wireless communication systems 200 that supports interference coordination in licensed shared radio frequency spectrum in accordance with aspects of the present disclosure. In some examples, neighboring wireless communication systems 200 may each implement aspects of wireless communication system 100. In the example of FIG. 2, a first network 205 may have an associated first base station 105-a and first UE 115-a that communicate via communications link 210. In this example, a second network 215 may be a neighboring network to the first network 205, and may have an associated second base station 105-b and second UE 115-b that communicate via communications link 220.

In some cases, both the first network 205 and the second network 215 may use a same licensed shared radio frequency spectrum band. Further, the first network 205 may have a lower priority for communications than the second network 215. For example, a regulatory authority may manage radio frequency resources of the licensed shared radio frequency spectrum, and may license the second network 215 with a higher priority to the licensed shared radio frequency spectrum band than the first network 205. In some cases, base stations 105 may determine associated network priority based on communications with a coexistence manager 235, communications with an associated core network, or any combinations thereof. In some cases, even within a single network, different resources or prioritizations may be provided for different services that communicate data via the network. For example, URLLC traffic may have a higher priority than traffic of other services (e.g., eMBB traffic), and prioritized URLLC resources may help to achieve latency and reliability targets of the URLLC traffic. For example, the second network 215 may be used to provide URLLC traffic for factory autonomation, and the geographic area of the second network 215 may be limited to the area around the associated factory. In such a case, a local licensee of the second network 215 may have priority for spectrum use in a designated geographic area while the spectrum use outside of the designated geographic area may be used by another licensee, such as a local or regional operator.

In accordance with techniques provided herein, an over-the-air mechanism may be used to supplement information provided by the coexistence manager 235. For example, the coexistence manager 235 may include a database that identifies licensed networks and indicates an associated priority of the network. Each license may have associated priority, which may also be referred to as a color, where different priorities may indicate a potential interference issue. In some examples, colors are used to indicate priority of a network, and different colors may mean a different priority or power class. Thus, in this example, the higher priority second network 215 may have a color that is ordered ahead of a color for the first network 205. Each of the first base station 105-a, second base station 105-b, first UE 115-a, and second UE 115-b may transmit an indication of the assigned color of the associated network. In some cases, a reference signal may indicate the color of the associated network (e.g., an SRS or RIM-RS sequence may be associated with a color).

In the example of FIG. 2, the first UE 115-a may measure a base station reference signal 230 (e.g., an RMI-RS) that is transmitted by the second base station 105-b, and may measure a UE reference signal 225 that is transmitted by the second UE 115-b. In some cases, if the received signal strength of one or both of the base station reference signal 230 or UE reference signal 225 is above a threshold value (e.g., a reference signal received power (RSRP) or received signal strength indicator (RSSI) is above a specified threshold value) and the indicated color has a higher priority than a color of the first network 205, the first UE 115-a may modify an associated first transmission of the first UE 115-a to mitigate potential interference with the second network 215. In some cases, the first UE 115-a may reduce a transmission power of the first transmission. In other cases, the first UE 115-a may refrain from transmitting. Such an over-the-air priority indication thus may be utilized to mitigate adversarial interference without requiring large geographic margins that are required if a database alone of the coexistence manager 235 were to be used to manage interference. Additionally or alternatively, as indicated above, such an over-the-air mechanism may also be utilized to enforce prioritization between URLLC and eMBB transmissions.

Further, such techniques may allow for priority indications and negotiations among neighboring networks without any direct negotiation among the first base station 105-a and second base station 105-b. In some cases, a number of disjoint sets of identities may be provided for RIM-RS and SRS configurations for disjoint colors, so the different networks can be identified by base station 105 and UE 115 measurements. For example, different reference signal sequences or sequence offset values may be associated with different colors or priorities. In some cases, the base stations 105 may receive such information from their associated core network, from the coexistence manager 235, or any combinations thereof. In some cases, the UEs 115 may receive such information from their serving base station 105 (e.g., via radio resources control (RRC) signaling, via a system information block (SSB) transmission, via a remaining minimum system information (RMSI) transmission, via other broadcast or unicast signaling, or any combinations thereof). In some cases, each network may be configured with a maximum allowed interference threshold of the neighboring networks, which may be used in determining a transmission power reduction for a transmission in the presence of second network 215 transmissions (e.g., transmission power of the first UE 115-a is reduced less for higher allowed interference thresholds and is reduced more for lower allowed interference thresholds). FIGS. 3 through 6 illustrate several examples of power management techniques for neighboring networks that use a same licensed shared radio frequency spectrum band. While the various examples illustrated herein show base stations 105 and UEs 115 as wireless nodes of different networks, such networks may include nodes that are of any type of wireless device (e.g., access points (APs) and stations (STAs) of a Wi-Fi network, etc.).

Figure 3:
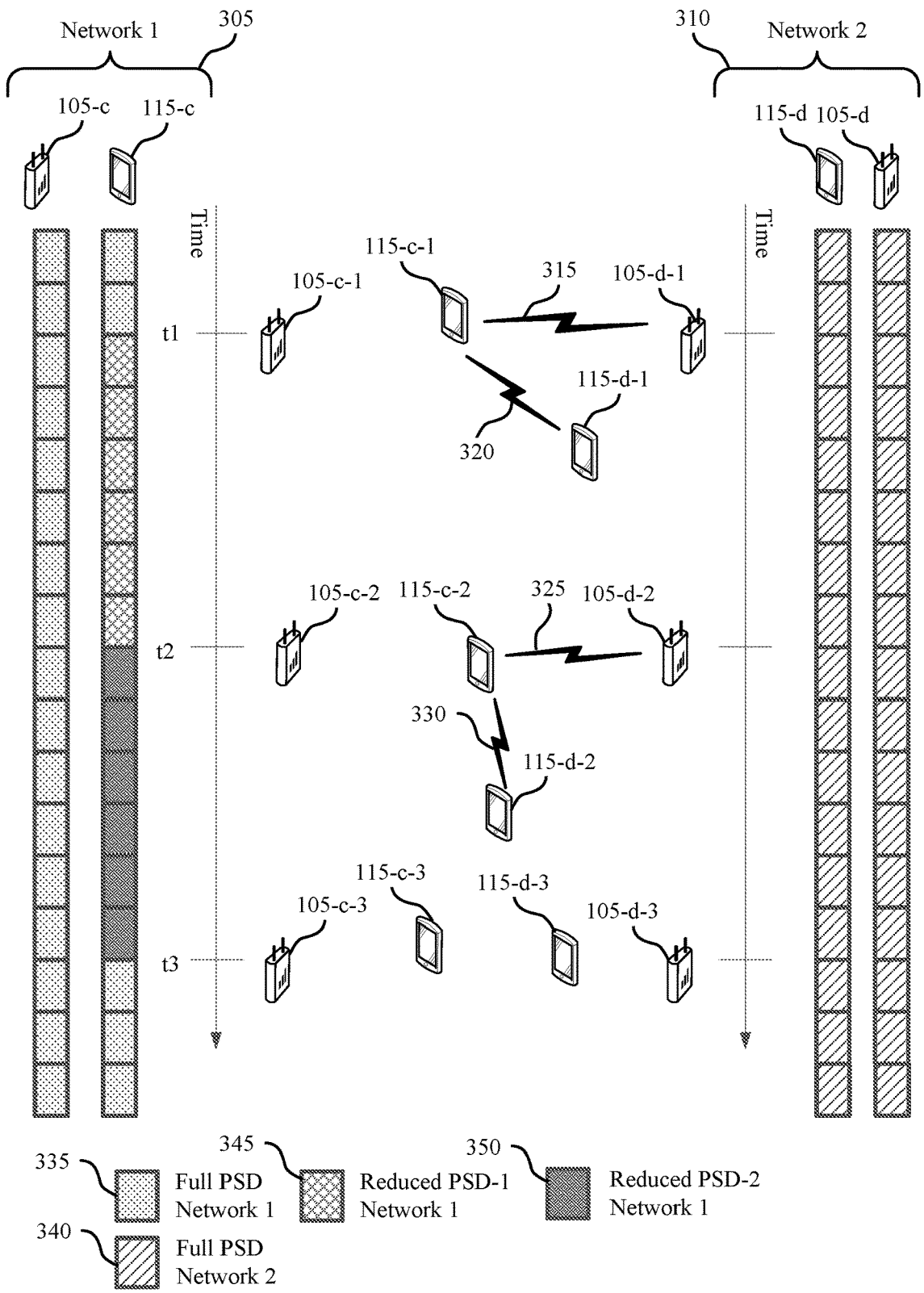
FIGS. 3 through 6 illustrate examples of power management techniques in neighboring networks that support interference coordination in licensed shared radio frequency spectrum in accordance with aspects of the present disclosure.

FIG. 3 illustrates an example of power management techniques 300 that support interference coordination in licensed shared radio frequency spectrum in accordance with aspects of the present disclosure. In some examples, power management techniques 300 may implement aspects of wireless communication system 100 or networks 205 or 215. In this example, a first network 305 may include a first base station 105-c and a first UE 115-c, and a second network 310 may include a second base station 105-d and a second UE 115-d. In this example, the second network 310 may have priority over the first network 305, and thus nodes of the second network 310 may always transmit at a full PSD 340 of the second network.

In this example, operations at multiple instances in time are described, including a first time t1, a second time t2, and a third time t3. In this example, prior to time t1, none of the first base station 105-c, first UE 115-c, second base station 105-d, or second UE 115-d may measure signals from a node of the other network, and thus transmission power at the first network 305 may be at a full power spectral density (PSD) 335 for the first network and the transmission power at the second network 310 may be at the full PSD 340 for the second network. At time t1, the first UE 115-c-1 may detect a reference signal 315 from the second base station 105-d-1, which may indicate a priority or color of the second network 310, and have an associated measured RSSI value (e.g., RSSI(BS$_d$(t$_1$))). At time t1, the first UE 115-c-1 may also detect a reference signal 320 from the second UE 115-d-1, which may indicate a priority or color of the second network 310, and have an associated measured RSSI value (e.g., RSSI(UE$_d$(t$_1$))). Based on the detected reference signals 315 and 320, and the identified priority thereof, the first UE 115-c-1 may perform a power reduction for associated uplink transmissions to mitigate potential interference with nodes of the second network 310, which may result in a first reduced PSD 345 of the first network 305. For example, the first UE 115-c-1 may determine a maximum PSD as a function of the maximum allowable PSD based on the measured reference signal strengths, such as:

$$UE_{psd\_max}(f_i)=\min(psd_{max}=f(RSSI(UE_d(t_1))),psd_{max}=f(RSSI(BS_d(t_1)))).$$

At time t2, the first UE 115-c-2 and second UE 115-d-2 may have moved to be in closer proximity and thus the first UE 115-c-2 may measure reference signal 325 from the second base station 105-d-2 (e.g., RSSI(BS$_d$(t$_2$)) and a reference signal 330 from the second UE 115-d-2, wherein the reference signal 330 may have a higher associated RSSI value (e.g., RSSI(UE$_d$(t$_2$))). Based on the detected reference signals 325 and 330, and the identified priority thereof, the first UE 115-c-2 may perform a power reduction for associated uplink transmissions to mitigate potential interference with nodes of the second network 310, which may result in a second reduced PSD 350 of the first network 305. For example, the first UE 115-c-2 may determine a maximum PSD as a function of the maximum allowable PSD based on the measured reference signal strengths, such as:

$$UE_{psd\_max}(f_i)=\min(psd_{max}=f(RSSI(UE_d(t_2))),psd_{max}=f(RSSI(BS_d(t_2)))).$$

Additionally, in some cases, the second network 310 may use carrier frequency and for the adjacent carrier frequencies the PSD limit for the first network 305 may be relaxed, but still enforced to help mitigate interference from the first network 305 due to adjacent channel leakage. Thus, for a certain frequency range from the carrier frequency, the amount of PSD reduction may be decreased. Further, in some cases, a nominal PSD may be used for transmissions sufficiently far from the carrier frequency of the second network (e.g., beyond a set range from the carrier frequency of the second network).

At time t3, the first UE 115-c-3 and second UE 115-d-3 may have moved such that none of the first base station 105-c-3, first UE 115-c-3, second base station 105-d-3, or second UE 115-d-3 may measure signals from a node of the other network, and thus transmission power at the first network 305 may be at the full PSD 335 for the first network and the transmission power at the second network 310 may be at a full PSD 340 for the second network.

Figure 4:
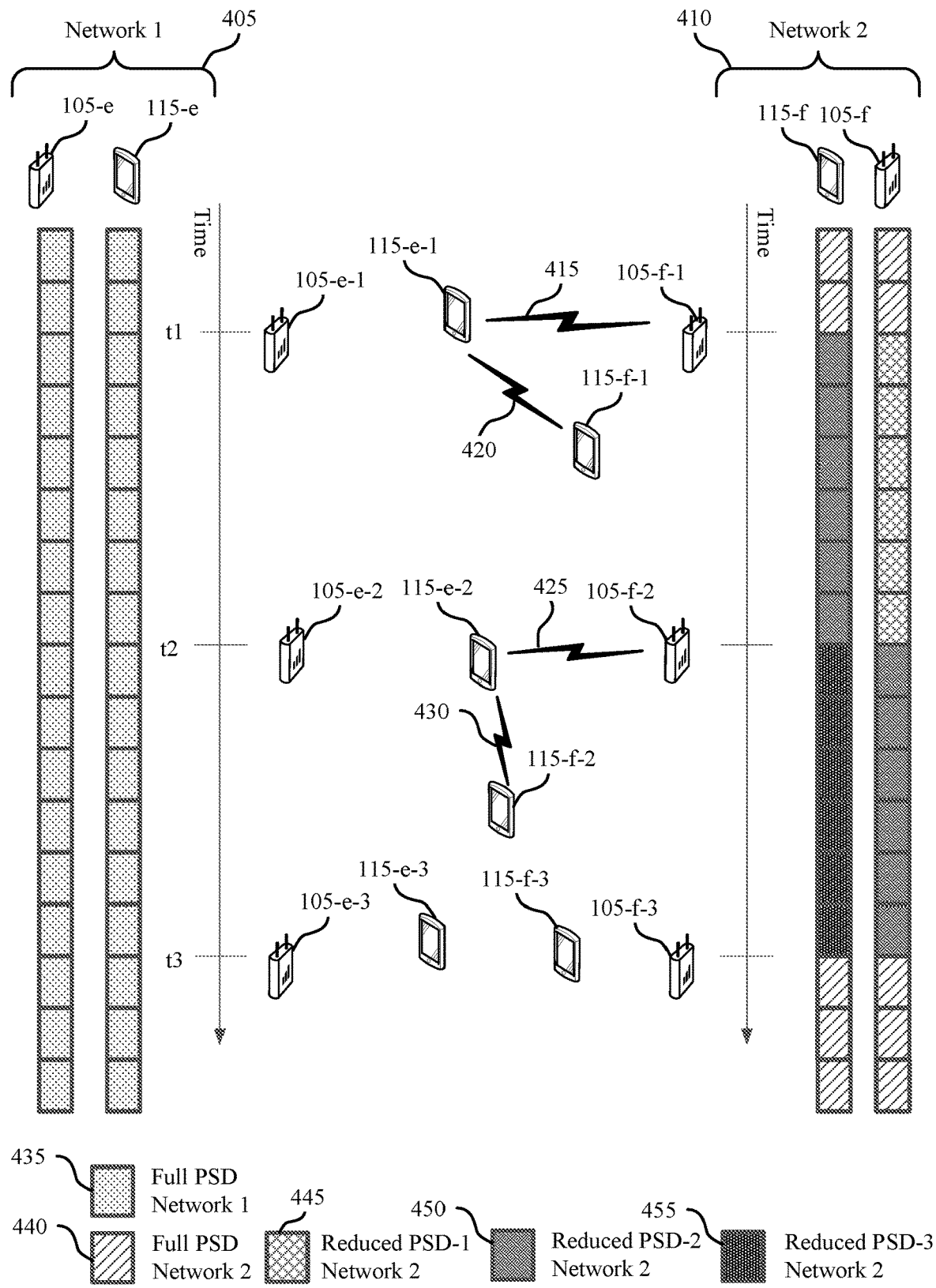

FIG. 4 illustrates another example of power management techniques 400 that support interference coordination in licensed shared radio frequency spectrum in accordance with aspects of the present disclosure. In some examples, power management techniques 400 may implement aspects of wireless communication system 100, or networks 205 or 215. In this example, a first network 405 may include a first base station 105-e and a first UE 115-e, and a second network 410 may include a second base station 105-f and a second UE 115-f This example is similar to the example of FIG. 3, except that the first network 405 may have priority over the second network 410.

Again in this example, operations at multiple instances in time are described, including a first time t1, a second time t2, and a third time t3. In this example, prior to time t1, none of the first base station 105-e, first UE 115-e, second base station 105-f, or second UE 115-f may measure signals from a node of the other network, and thus transmission power at the first network 405 may be at a full PSD 435 for the first network and the transmission power at the second network 410 may be at a full PSD 440 for the second network. Further, based on the priority of the first network 405, its nodes may always transmit at the full PSD 435 for the first network.

At time t1, the second base station 105-f-1 may detect a reference signal 415 from the first UE 115-e-1, and the second UE 115f-1 may detect reference signal 420 from the first UE 115-e-1 (which may be a same reference signal, such as a SRS), which may indicate a priority or color of the first network 405, and have an associated measured RSSI value (e.g., RSSI(UEe(t$_1$)). Based on the detected reference signals 415 and 420, and the identified priority thereof, the second base station 105-f-1 may perform a power reduction for associated downlink transmissions to mitigate potential interference with nodes of the first network 405, which may result in a first reduced PSD 445 of the second network 410. Further, the second UE 115-f-1 may perform a power reduction for associated uplink transmissions to mitigate potential interference with nodes of the first network 405, which may result in a second reduced PSD 450 of the second network 410. For example, the second UE 115-*f*-1 and second base station 105-*f*-1 may determine a maximum PSD as a function of the maximum allowable PSD based on the corresponding measured reference signal strengths.

At time t2, when the first UE 115-*e*-2 and second UE 115-*f*-2 have moved to be in closer proximity, the second base station 105-*f*-2 may measure reference signal 425 and the second UE 115-*f*-2 may measure reference signal 430 from the first UE 115-*e*-2. Based on the detected reference signals 425 and 430, and the identified priority thereof, the second UE 115-*f*-2 may perform a power reduction for associated downlink transmissions to mitigate potential interference with nodes of the first network 405, which may result in a third reduced PSD 455 of the second network 410. Likewise, the second base station 105-*f*-2 may perform a power reduction for associated uplink transmissions to mitigate potential interference with nodes of the first network 405, which may result in the second reduced PSD 450 of the second network 410. Again, maximum PSDs may be determined as a function of the maximum allowable PSD based on the measured reference signal strengths.

At time t3, the first UE 115-*e*-3 and second UE 115-*f*-3 may have moved such that none of the first base station 105-*e*-3, first UE 115-*e*-3, second base station 105-*f*-3, or second UE 115-*f*-3 may measure signals from a node of the other network, and thus transmission power at the first network 405 may be at the full PSD 435 for the first network and the transmission power at the second network 410 may be at a full PSD 440 for the second network.

Figure 5:
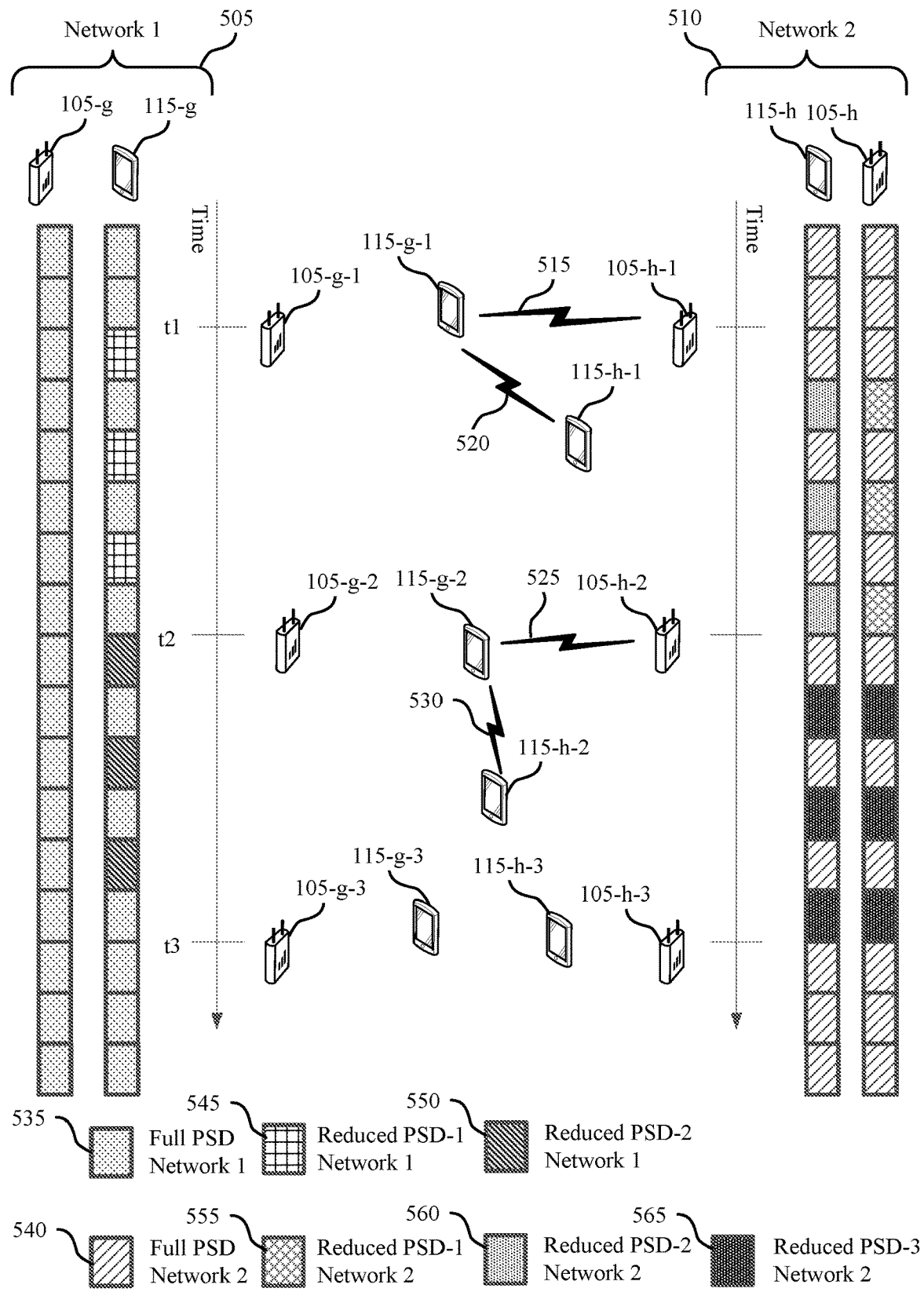
Figure 6:
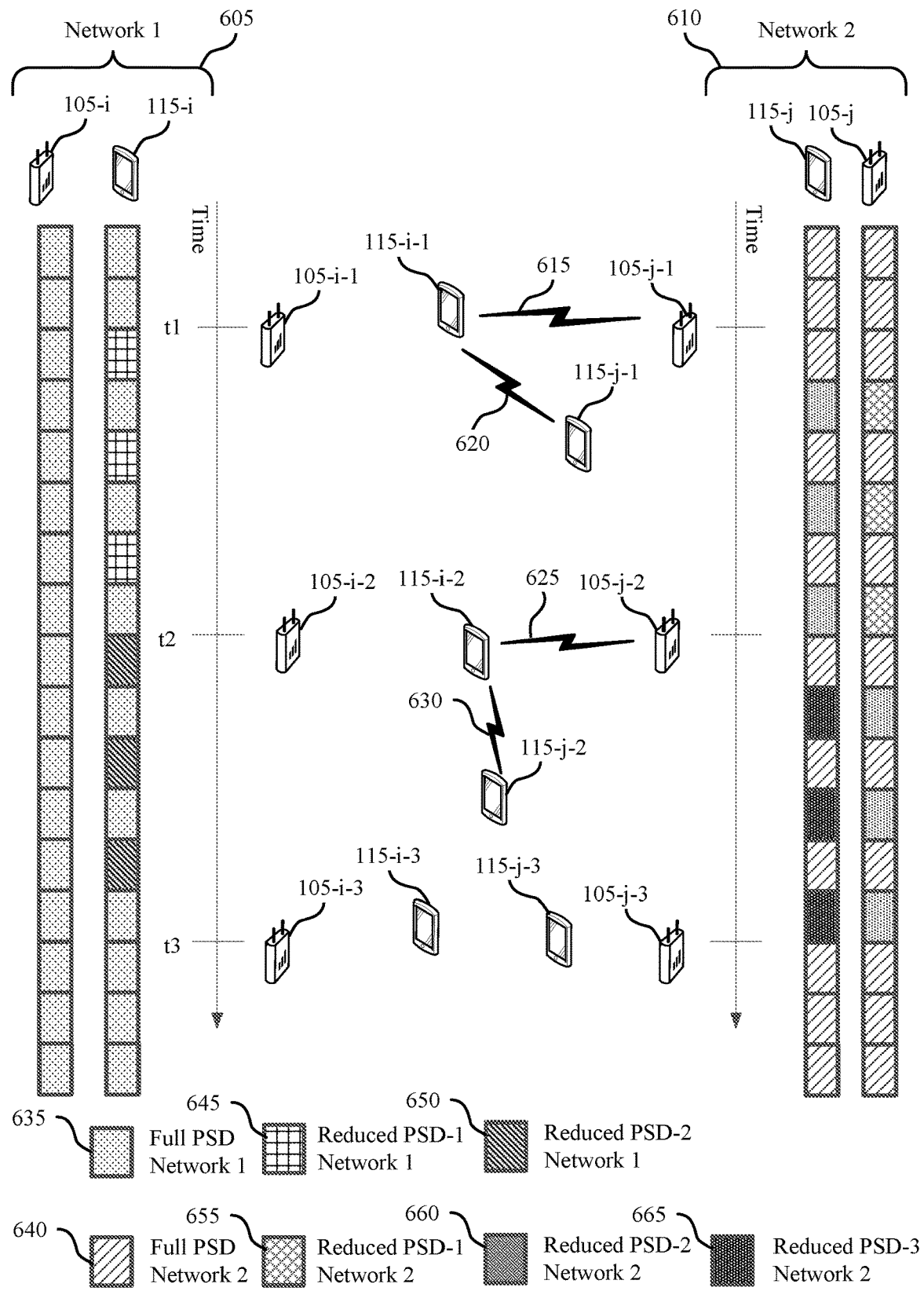

As indicated above, in some cases different networks may be allocated to have different priorities in a licensed shared radio frequency spectrum band at different time resources. FIGS. 5 and 6 illustrate examples of different time resources in which different networks have higher priorities.

FIG. 5 illustrates an example of power management techniques 500 that support interference coordination in licensed shared radio frequency spectrum in accordance with aspects of the present disclosure. In some examples, power management techniques 500 may implement aspects of wireless communication system 100 or networks 205 or 215. In this example, a first network 505 may include a first base station 105-*g* and a first UE 115-*g*, and a second network 510 may include a second base station 105-*h* and a second UE 115-*h*. This example is similar to the examples of FIGS. 3 and 4, except that the first network 505 may have priority over the second network 510 for a first set of time resources, and the second network 510 may have priority over the first network 505 for a second set of time resources. In some cases, the first network 505 and second network 510 may have synchronized frame timings. Such synchronization may have a number of benefits, such as allowing more efficient measurement procedures for the discovery of other networks, enabling the alignment of TDD configurations among networks utilizing adjacent frequency resources (to reduce interference), facilitates relaxation of effective isotropic radiated power (EIRP) limits at base stations 105, enables time domain resource partitioning, enables efficient sensing based medium sharing, or any combinations thereof. In some cases, a global synchronization (compared to a global timing reference) may also be part of the priority or color information provided to base stations 105.

In the example of FIG. 5, each network 505, 510 has its own prioritized time domain resources, and PSD limitations apply only for resources prioritized for the other network and only for nodes (base stations and UEs) that, based on measurements, are possible interferers. Similarly as in the examples of FIGS. 3 and 4, operations at multiple instances in time are described, including a first time t1, a second time t2, and a third time t3. In this example, prior to time t1, none of the first base station 105-*g*, first UE 115-*g*, second base station 105-*h*, or second UE 115-*h* may measure signals from a node of the other network, and thus transmission power at the first network 505 may be at a full PSD 535 for the first network and the transmission power at the second network 510 may be at a full PSD 540 for the second network.

At time t1, the second base station 105-*h*-1 may detect a reference signal 515 from the first UE 115-*g*-1, and the second UE 115-*h*-1 may detect reference signal 520 from the first UE 115-*g*-1 (which may be a same reference signal, such as an SRS), which may indicate a priority or color of the first network 505, and have an associated measured RSSI value. Further, the first UE 115-*g*-1 may measure reference signals from the second UE 115-*h*-1 and the second base station 105-*h*-1. Based on the detected reference signals, and the identified priority thereof, the second base station 105-*h*-1 may perform a power reduction for associated downlink transmissions to mitigate potential interference with nodes of the first network 505 during time resources where the first network 505 has priority, which may result in a first reduced PSD 555 of the second network 510. Further, the second UE 115-*h*-1 may perform a power reduction for associated uplink transmissions to mitigate potential interference with nodes of the first network 505, which may result in a second reduced PSD 560 of the second network 510. Additionally, the first UE 115-*g*-1 may perform a power reduction for associated uplink transmissions to mitigate potential interference with nodes of the second network 510 during time resources where the second network 510 has priority, which may result in a first reduced PSD 545 of the first network 505.

At time t2, when the first UE 115-*g*-2 and second UE 115-*h*-2 have moved to be in closer proximity, the second base station 105-*h*-2 may measure reference signal 525 and the second UE 115-*h*-2 may measure reference signal 530 from the first UE 115-*g*-2. Based on the detected reference signals 525 and 530, and the identified priority thereof, the second UE 115-*h*-2 may perform a power reduction for associated downlink transmissions in the time domain resources with first network priority to mitigate potential interference with nodes of the first network 505, which may result in a third reduced PSD 565 of the second network 510. Likewise, the second base station 105-*h*-2 may perform a power reduction for associated uplink transmissions to mitigate potential interference with nodes of the first network 505, which may result in the third reduced PSD 565 of the second network 510.

Further, the first UE 115-*g*-2 may measure reference signals from the second UE 115-*h*-2 and the second base station 105-*h*-2. The first UE 115-*g*-2 may perform a power reduction for associated uplink transmissions to mitigate potential interference with nodes of the second network 510 during time resources where the second network 510 has priority, which may result in a second reduced PSD 550 of the first network 505. Again, maximum PSDs may be determined as a function of the maximum allowable PSD based on the measured reference signal strengths.

At time t3, the first UE 115-*g*-3 and second UE 115-*h*-3 may have moved such that none of the first base station 105-*g*-3, first UE 115-*g*-3, second base station 105-*h*-3, or second UE 115-*h*-3 may measure signals from a node of the other network, and thus transmission power at the first network 505 may be at the full PSD 535 for the first network and the transmission power at the second network 510 may be at a full PSD 540 for the second network.

FIG. 6 illustrates an example of power management techniques 600 that support interference coordination in licensed shared radio frequency spectrum in accordance with aspects of the present disclosure. In some examples, power management techniques 600 may implement aspects of wireless communication system 100, or networks 205 or 215. In this example, a first network 605 may include a first base station 105-*i* and a first UE 115-*i*, and a second network 610 may include a second base station 105-*j* and a second UE 115-*j*. This example is similar to the example of FIG. 5, except that dynamic sharing of resources may be provided, in which a power reduction is performed only in the event that a transmission of the other network is detected (e.g., based on an LBT or CCA procedure). In this example, again the first network 605 may have priority over the second network 610 for a first set of time resources, and the second network 610 may have priority over the first network 605 for a second set of time resources, and the first network 605 and second network 610 may have synchronized frame timings.

In the example of FIG. 6, each network 605, 610 has its own prioritized time domain resources, and PSD limitations apply only for resources prioritized for the other network and only for nodes (base stations and UEs) that, based on measurements, are possible interferers. Again, operations at multiple instances in time are described, including a first time t1, a second time t2, and a third time t3. In this example, prior to time t1, none of the first base station 105-*i*, first UE 115-*i*, second base station 105-*j*, or second UE 115-*j* may measure signals from a node of the other network, and thus transmission power at the first network 605 may be at a full PSD 635 for the first network and the transmission power at the second network 610 may be at a full PSD 640 for the second network.

At time t1, the second base station 105-*j*-1 may detect a reference signal 615 from the first UE 115-*i*-1, and the second UE 115-*j*-1 may detect reference signal 620 from the first UE 115-*i*-1 (which may be a same reference signal, such as an SRS), which may indicate a priority or color of the first network 605, and have an associated measured RSSI value. Further, the first UE 115-*i*-1 may measure reference signals from the second UE 115-*j*-1 and the second base station 105-*j*-1. Based on the detected reference signals, and the identified priority thereof, the second base station 105-*j*-1 may perform a power reduction for associated downlink transmissions to mitigate potential interference with nodes of the first network 605 during time resources where the first network 605 has priority, which may result in a first reduced PSD 655 of the second network 610. In some cases, the second base station 105-*j*-1 and the second UE 115-*j*-1 may perform medium sensing (e.g., an LBT or CCA procedure) and if a transmission of the first network 605 is not detected (e.g., a reservation signal), the full PSD 640 of the second network 610 may be used.

Likewise, the second UE 115-*j*-1 may perform medium sensing to determine to transmit at full power or at a power reduction to mitigate potential interference with nodes of the first network 605, which may result in a second reduced PSD 660 of the second network 610. Further, the first UE 115-*i*-1 may perform medium sensing to determine to transmit at full PSD 635 of the first network 605 or to transmit at a power reduction for associated uplink transmissions to mitigate potential interference with nodes of the second network 610 during time resources where the second network 610 has priority, which may result in a first reduced PSD 645 of the first network 605.

Such medium sensing and reference signal monitoring may continue at t2 and at t3 as discussed with respect to FIG. 5, with the additional medium sensing performed at each node to determine whether to transmit at a reduced PSDs 650, 660, or 665, or the full PSDs 635, 640. Accordingly, such techniques may provide for dynamic determination of power reductions based on whether another network is using the corresponding licensed shared radio frequency spectrum.

Figure 7:
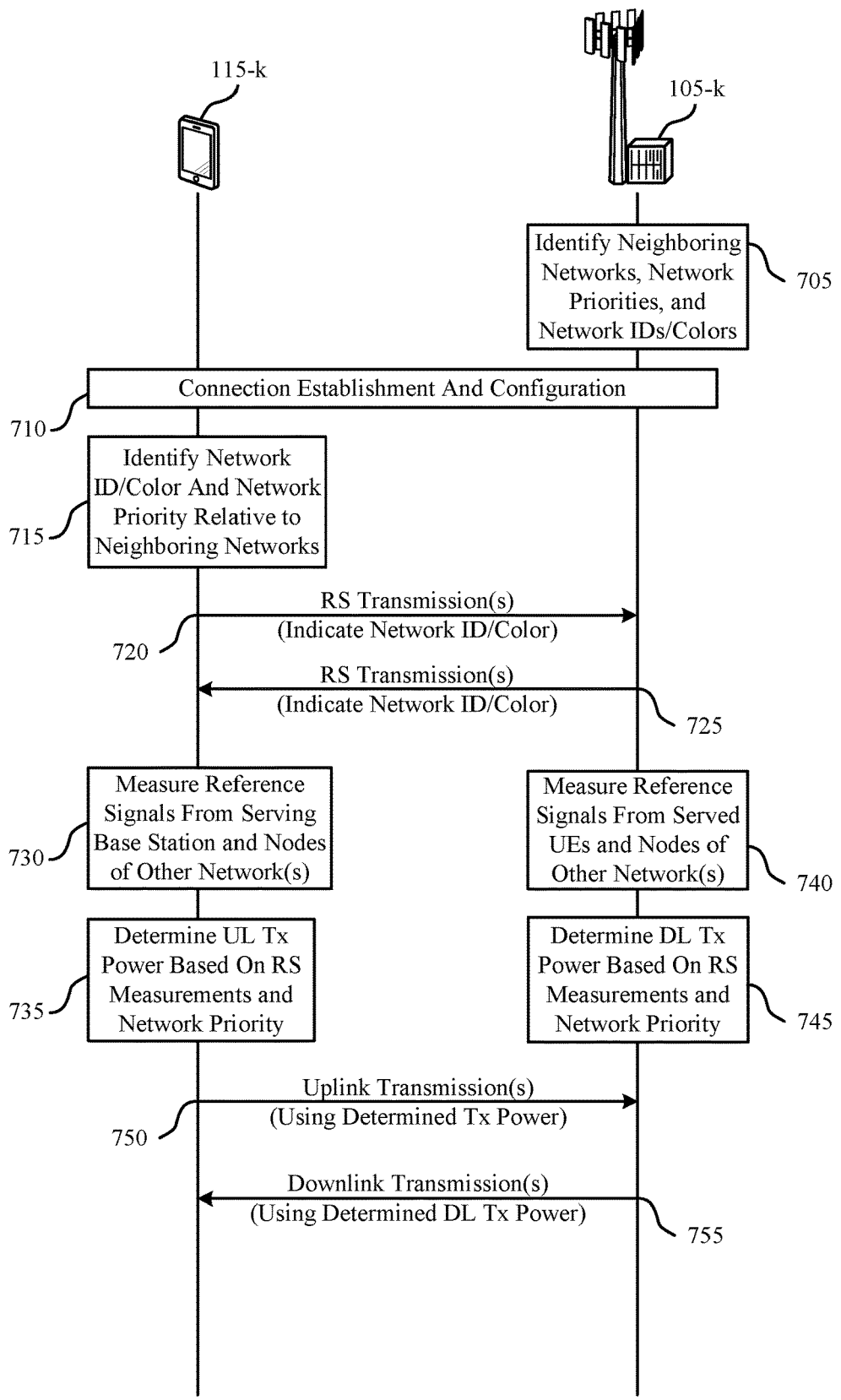
FIG. 7 illustrates an example of a process flow that supports interference coordination in licensed shared radio frequency spectrum in accordance with aspects of the present disclosure.

FIG. 7 illustrates an example of a process flow 700 that supports interference coordination in licensed shared radio frequency spectrum in accordance with aspects of the present disclosure. In some examples, process flow 700 may implement aspects of wireless communication systems 100, or networks 205 or 215. The process flow 700 may include a base station 105-*k* and a UE 115-*k*, which may be examples of the corresponding devices described with reference to FIGS. 1 through 6. In the following description of the process flow 700, the operations between the base station 105-*k* and the UE 115-*k* may be transmitted in a different order than the example order shown, or the operations performed by the base station 105-*k* and the UE 115-*k* may be performed in different orders or at different times. Some operations may also be omitted from the process flow 700, and other operations may be added to the process flow 700.

At 705, the base station 105-*k* may identify one or more neighboring networks, one or more network priorities, one or more network IDs, one or more network colors, or any combinations thereof. In some cases, the base station 105-*k* may receive configuration data from a core network, a coexistence manager, or combinations thereof, that indicates neighboring network information. In some cases, the base station 105-*k* may identify time resources associated with different network priorities, a maximum allowed interference at one or more neighboring networks, or any combinations thereof. In some cases, the network priority information may be associated with a particular service of the network (e.g., URLLC service) that may have a higher priority or color than other communications.

At 710, the UE 115-*k* and the base station 105-*k* may perform a connection establishment and configuration procedure. In some cases, the base station 105-*k* may provide configuration information to the UE 115-*k* during such a procedure to configure interference management techniques such as discussed herein when the connection uses a licensed shared radio frequency spectrum.

At 715, the UE 115-*k* may identify a network identification, network color, network priority relative to neighboring networks, or any combinations thereof. In some cases, this identification may be based on configuration information provided by the base station 105-*k*. In some cases, configuration information may be provided in RRC signaling, in an SIB, in an RMSI transmission, in unicast signaling (e.g., via a physical downlink control channel (PDCCH) or PDSCH), or any combinations thereof.

At 720, the UE 115-*k* may transmit one or more reference signal transmissions, such as one or more SRS transmissions. In some cases, the one or more reference signal transmissions may include an indication of network priority, network identification, network color, or any combinations thereof. In some cases, a network priority may be indicated based on a reference signal sequence used for the one or more reference signal transmissions. Likewise, at 725, the base station 105-*k* may transmit one or more reference signal transmissions, such as one or more RIM-RS transmissions. In some cases, the one or more reference signal transmissions may include an indication of network priority, network identification, network color, or any combinations thereof.

In some cases, a network priority may be indicated based on a reference signal sequence used for the one or more reference signal transmissions.

At 730, the UE 115-k may measure reference signals from the serving base station 105-k and from one or more other nodes of one or more other networks. In some cases, measured reference signals from one or more other nodes may indicate an associated priority or color of the network associated with the one or more other nodes, which may be used to determine a relative transmission priority of the other network relative to the network of the UE 115-k and base station 105-k. At 735, the UE 115-k may determine an uplink transmission power based on the reference signal measurements and the identified network priorities. Such determination of transmit power may be performed in accordance with techniques such as discussed with reference to FIGS. 2 through 6.

At 740, the base station 105-k may measure reference signals from the UE 115-k and from one or more other nodes of one or more other networks. In some cases, measured reference signals from one or more other nodes may indicate an associated priority or color of the network associated with the one or more other nodes, which may be used to determine a relative transmission priority of the other network relative to the network of the UE 115-k and base station 105-k. At 745, the base station 105-k may determine a downlink transmission power based on the reference signal measurements and the identified network priorities. Such determination of transmit power may be performed in accordance with techniques such as discussed with reference to FIGS. 2 through 6.

At 750, the UE 115-k may transmit one or more uplink transmissions to the base station 105-k. Likewise, at 755, the base station 105-k may transmit one or more downlink transmissions to the UE 115-k. In each case, the transmitting node (i.e., UE 115-k or base station 105-k) may perform the transmission using the determined transmit power, which in some cases may be a reduced transmit power based on detection of one or more signals from another higher priority network. In some cases, the UE 115-k and base station 105-k may transmit at reduced transmission power based on a dynamic determination of whether a node of another higher priority network is transmitting (e.g., based on an LBT or CCA procedure).

The operations performed by the base station 105-k and the UE 115-k as part of, but not limited to, process flow 700 may provide improvements to base station 105-k and UE 115-k transmission reliability. For example, by providing an indication of a network priority when transmitting reference signals, neighboring lower priority networks may reduce associated transmit powers or refrain from transmissions, which may help reduce interference at the base station 105-k or UE 115-k, and thereby enhance reliability. Further, the operations performed by the base station 105-k and the UE 115-k as part of, but not limited to, process flow 700 may provide benefits and enhancements in that licensed shared radio frequency spectrum may be used more efficiently.

Figure 8:
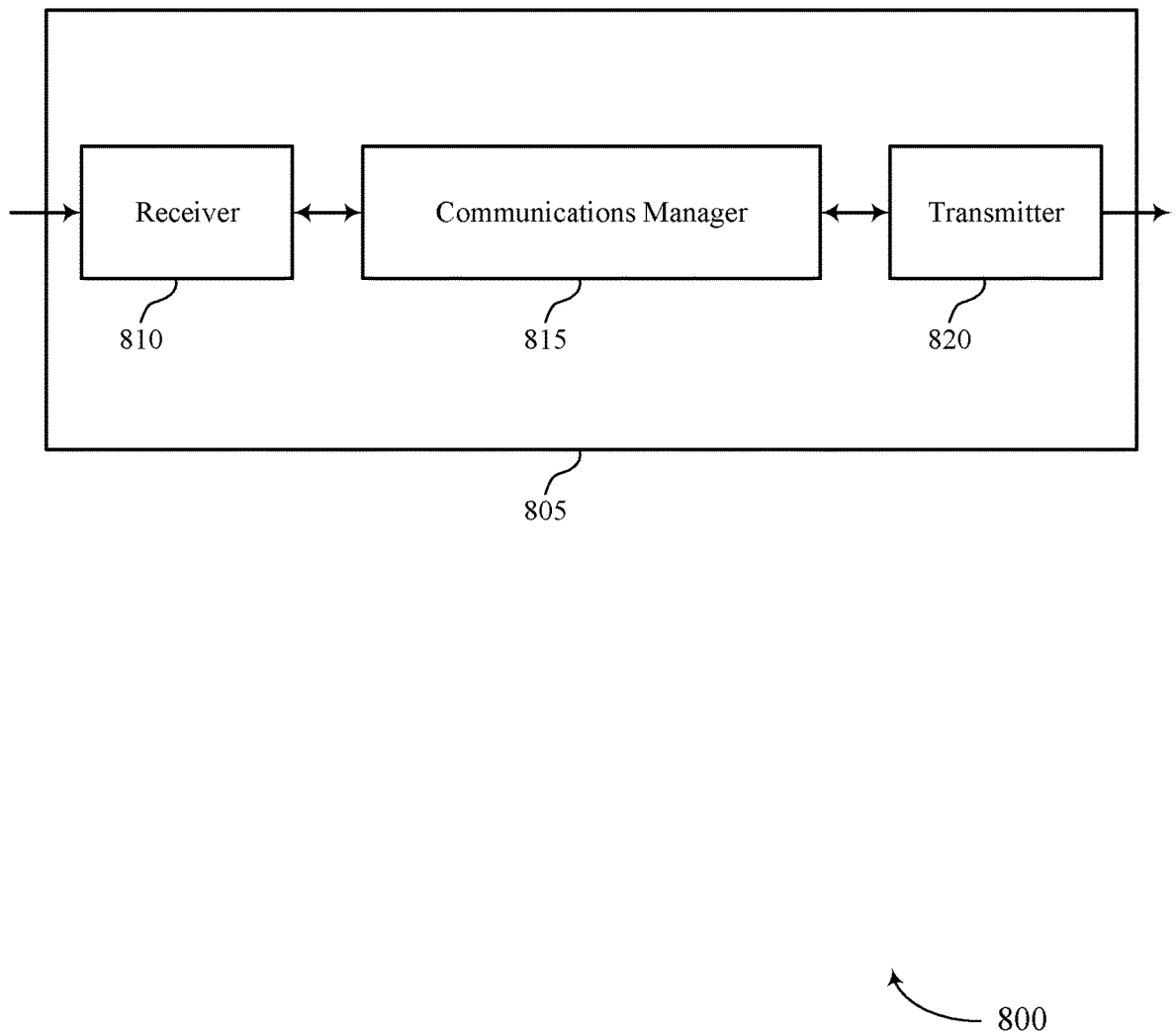
FIGS. 8 and 9 show block diagrams of devices that support interference coordination in licensed shared radio frequency spectrum in accordance with aspects of the present disclosure.

FIG. 8 shows a block diagram 800 of a device 805 that supports interference coordination in licensed shared radio frequency spectrum in accordance with aspects of the present disclosure. The device 805 may be an example of aspects of a UE 115 or other wireless device as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to interference coordination in licensed shared radio frequency spectrum, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, at a first node of a first network, configuration information for communicating with a second node of the first network via a shared radio frequency spectrum band, the configuration information including a network identification of the first network and a first priority of the first network relative to one or more other priorities of one or more other networks, measure a received signal strength of one or more other wireless nodes of the one or more other networks, determine a transmission power for one or more communications to the second node based on the received signal strength of the one or more other wireless nodes and the first priority of the first network, and transmit the one or more communications to the second node based on the determining. The one or more communications may be communications between any types nodes of a wireless communications system such as, for example, uplink communications from a UE to a base station, downlink communications from a base station to a UE, device-to-device communications between UEs or base stations, communications from an AP to a STA, communications from a STA to an AP, or communications from a router, repeater, relay, IAB node, or other network device. The communications manager 815 may be an example of aspects of the communications manager 1110 described herein.

The communications manager 815 may as described herein be implemented to realize one or more potential advantages. One implementation may allow the device 805 to provide an indication of a network priority when transmitting reference signals, and to reduce associated transmit powers or refrain from transmissions when higher priority networks are detected, which may help reduce interference at nodes of neighboring networks, and thereby enhance reliability. Further, implementations may allow the device 805 to utilize licensed shared radio frequency spectrum more efficiently, among other advantages.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
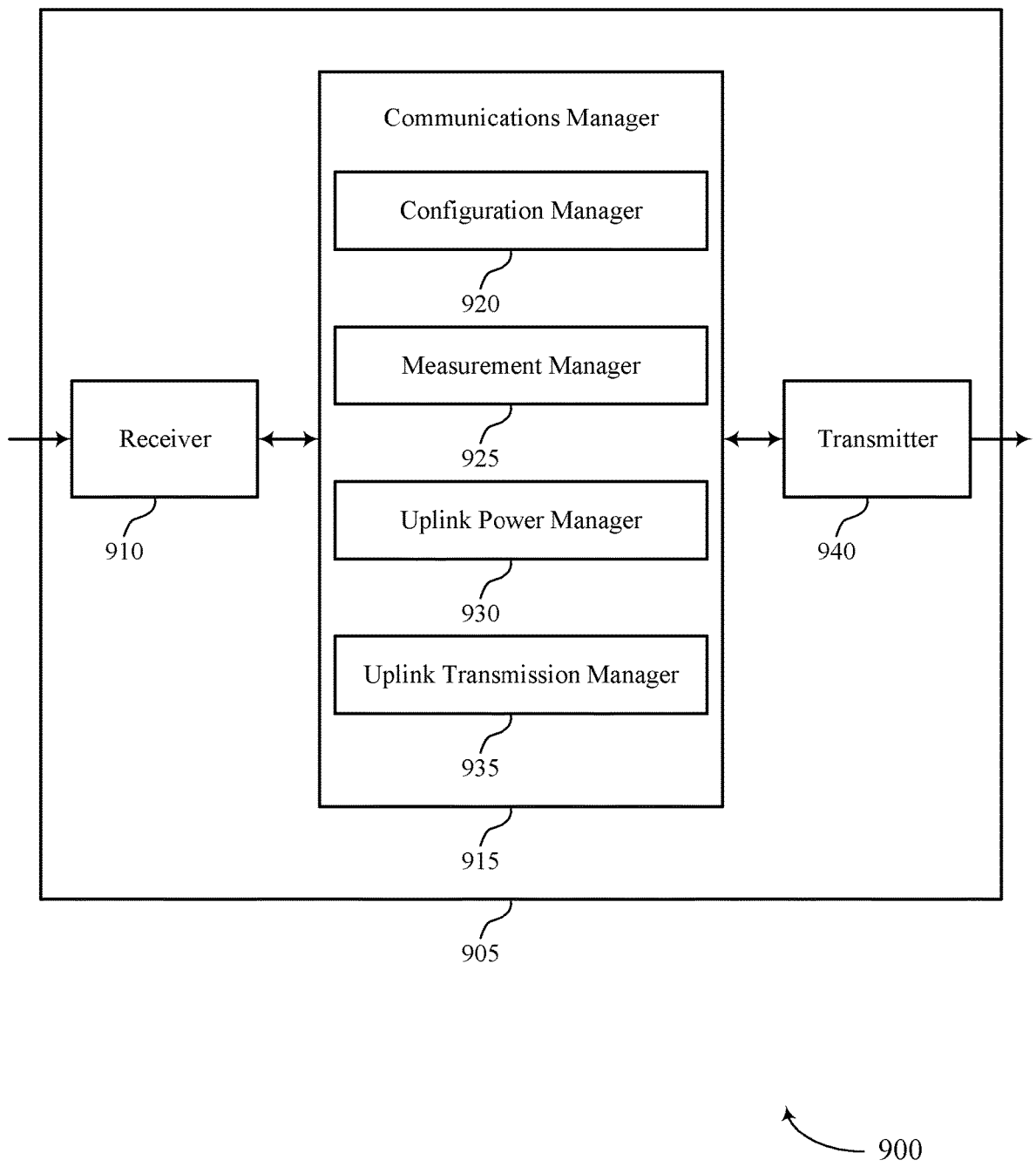

FIG. 9 shows a block diagram 900 of a device 905 that supports interference coordination in licensed shared radio frequency spectrum in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to interference coordination in licensed shared radio frequency spectrum, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration manager 920, a measurement manager 925, an uplink power manager 930, and an uplink transmission manager 935. The communications manager 915 may be an example of aspects of the communications manager 1110 described herein.

The configuration manager 920 may receive, at a first node of a first network, configuration information for communicating with a second node of the first network via a shared radio frequency spectrum band, the configuration information including a network identification of the first network and a first priority of the first network relative to one or more other priorities of one or more other networks.

The measurement manager 925 may measure a received signal strength of one or more other wireless nodes of the one or more other networks.

The uplink power manager 930 may determine a transmission power for one or more uplink communications to the second node based on the received signal strength of the one or more other wireless nodes and the first priority of the first network.

The uplink transmission manager 935 may transmit the one or more uplink communications to the second node based on the determining.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
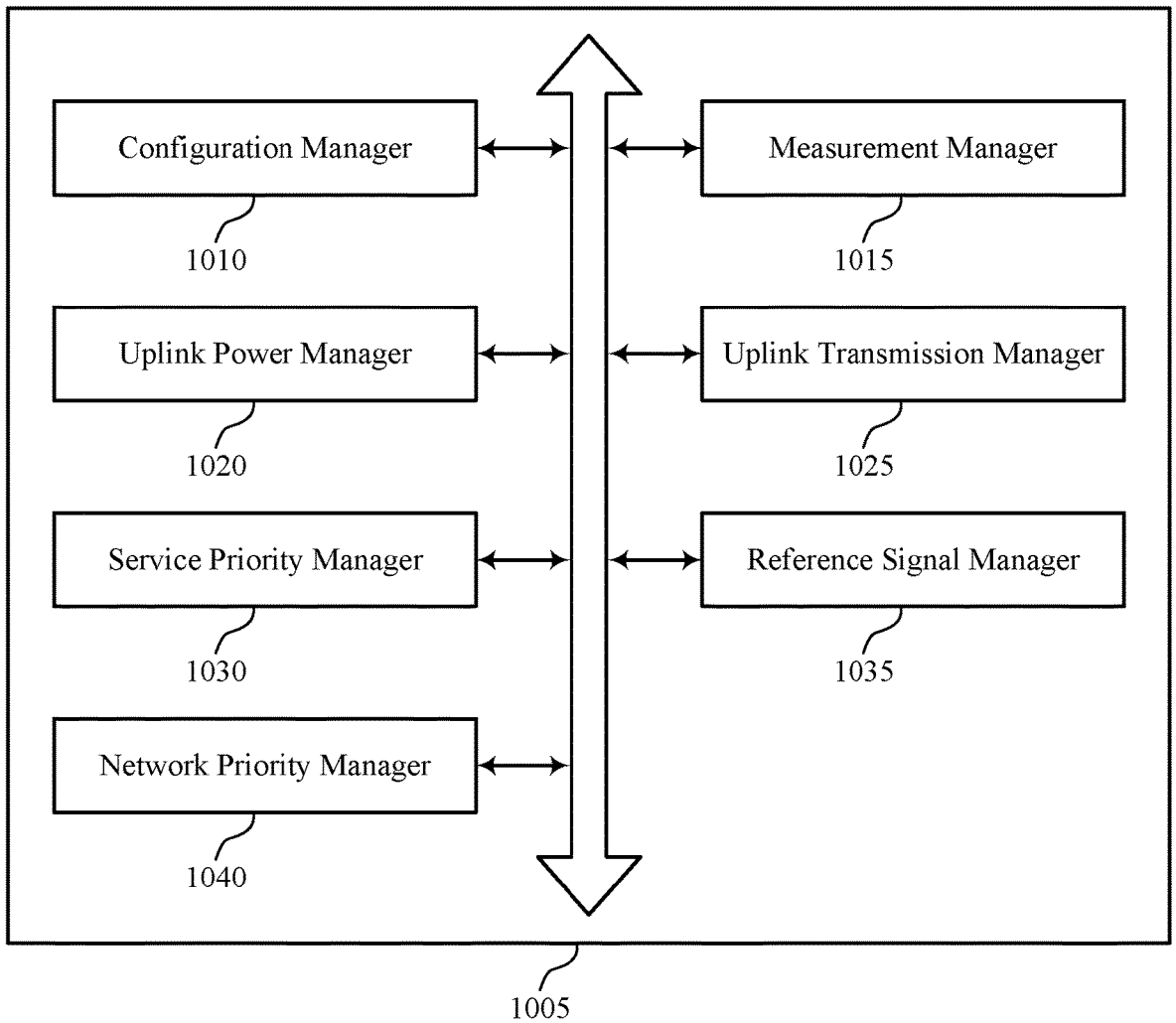
FIG. 10 shows a block diagram of a communications manager that supports interference coordination in licensed shared radio frequency spectrum in accordance with aspects of the present disclosure.

FIG. 10 shows a block diagram 1000 of a communications manager 1005 that supports interference coordination in licensed shared radio frequency spectrum in accordance with aspects of the present disclosure. The communications manager 1005 may be an example of aspects of a communications manager 815, a communications manager 915, or a communications manager 1110 described herein. The communications manager 1005 may include a configuration manager 1010, a measurement manager 1015, an uplink power manager 1020, an uplink transmission manager 1025, a service priority manager 1030, a reference signal manager 1035, and a network priority manager 1040. Each of these modules may communicate, directly or indirectly, with one another (e.g., via one or more buses).

The configuration manager 1010 may receive, at a first node of a first network, configuration information for communicating with a second node of the first network via a shared radio frequency spectrum band, the configuration information including a network identification of the first network and a first priority of the first network relative to one or more other priorities of one or more other networks. In some cases, the configuration information includes a first network identity of the first network that is indicated in one or more reference signals transmitted from nodes of the first network. In some cases, the configuration information further indicates a maximum allowed interference of the one or more other networks, and where the transmission power is further determined based on the maximum allowed interference of the one or more other networks. In some cases, the configuration information further indicates synchronization information for frame synchronization among the first network and the one or more other networks.

The measurement manager 1015 may measure a received signal strength of one or more other wireless nodes of the one or more other networks.

The uplink power manager 1020 may determine a transmission power for one or more uplink communications to the second node of the first network based on the received signal strength of the one or more other wireless nodes and the first priority of the first network. In some examples, the uplink power manager 1020 may reduce the transmission power for the one or more uplink communications by a set amount based on the signal strength of the second reference signal and the higher priority of the second network. In some examples, the uplink power manager 1020 may identify a set of signal strength thresholds, and where the reducing the transmission power for the one or more uplink communications is based on the signal strength of the second reference signal relative to the set of signal strength thresholds.

In some examples, the uplink power manager 1020 may reduce the transmission power for the one or more uplink communications by a first reduction amount for uplink communications in a first frequency band that at least partially overlaps the first carrier frequency. In some examples, the uplink power manager 1020 may reduce the transmission power for the one or more uplink communications by a second reduction amount for uplink communications in a second frequency band that is adjacent to the first carrier frequency. In some examples, the uplink power manager 1020 may maintain a nominal transmission power for the one or more uplink communications in a third frequency band that is outside of a set range of the first carrier frequency.

In some examples, the uplink power manager 1020 may determine that the received signal strength of the one or more other wireless nodes of the one or more other networks is below a threshold value or that a reservation signal from the one or more other networks is undetected. In some examples, the uplink power manager 1020 may maintain a nominal transmission power for the one or more uplink communications irrespective of the first priority relative to the one or more other priorities based on a lack of a reservation signal or determination of channel occupancy of the one or more other networks.

In some cases, the transmission power for the one or more uplink communications is reduced for time resources, frequency resources, or combinations thereof, in which the one or more other networks have higher priority than the first network, and the transmission power for the one or more uplink communications is maintained at a nominal level for time resources, frequency resources, or combinations thereof, in which the first network has higher priority than the one or more other networks.

The uplink transmission manager 1025 may transmit the one or more uplink communications to the second node based on the determining. In some examples, the uplink transmission manager 1025 may refrain from transmitting uplink communications via the shared radio frequency spectrum band when the signal strength of the second reference signal exceeds a set limit.

The service priority manager 1030 may determine a service priority of a data channel to be transmitted to the second node, and where the transmission power is further determined based on the service priority relative to a set of service priorities.

The reference signal manager 1035 may identify at least a first reference signal of the second node based on the first network identity indicated in the first reference signal. In some examples, the reference signal manager 1035 may identify at least a second reference signal of a second network associated with one or more of the other wireless nodes based on a second network identity indicated in the second reference signal. In some examples, the one or more reference signals include one or more of a remote interference management reference signal (RIM-RS) or an SRS. In some examples, the reference signal manager 1035 may determine that a signal strength of the second reference signal exceeds a threshold value.

The network priority manager 1040 may determine that the second network has a higher priority than the first network based on one or more of the first network identity or the second network identity. In some examples, the network priority manager 1040 may determine that a second network has a higher priority than the first network and has a first carrier frequency.

In some cases, the first priority is determined based on a priority configuration provided by a coexistence manager associated with the first network and the one or more other networks. In some cases, the first priority relative to the one or more other priorities of the one or more other networks is based on one or more of time resources or frequency resources, and where the time resources are determined based on the synchronization information.

Figure 11:
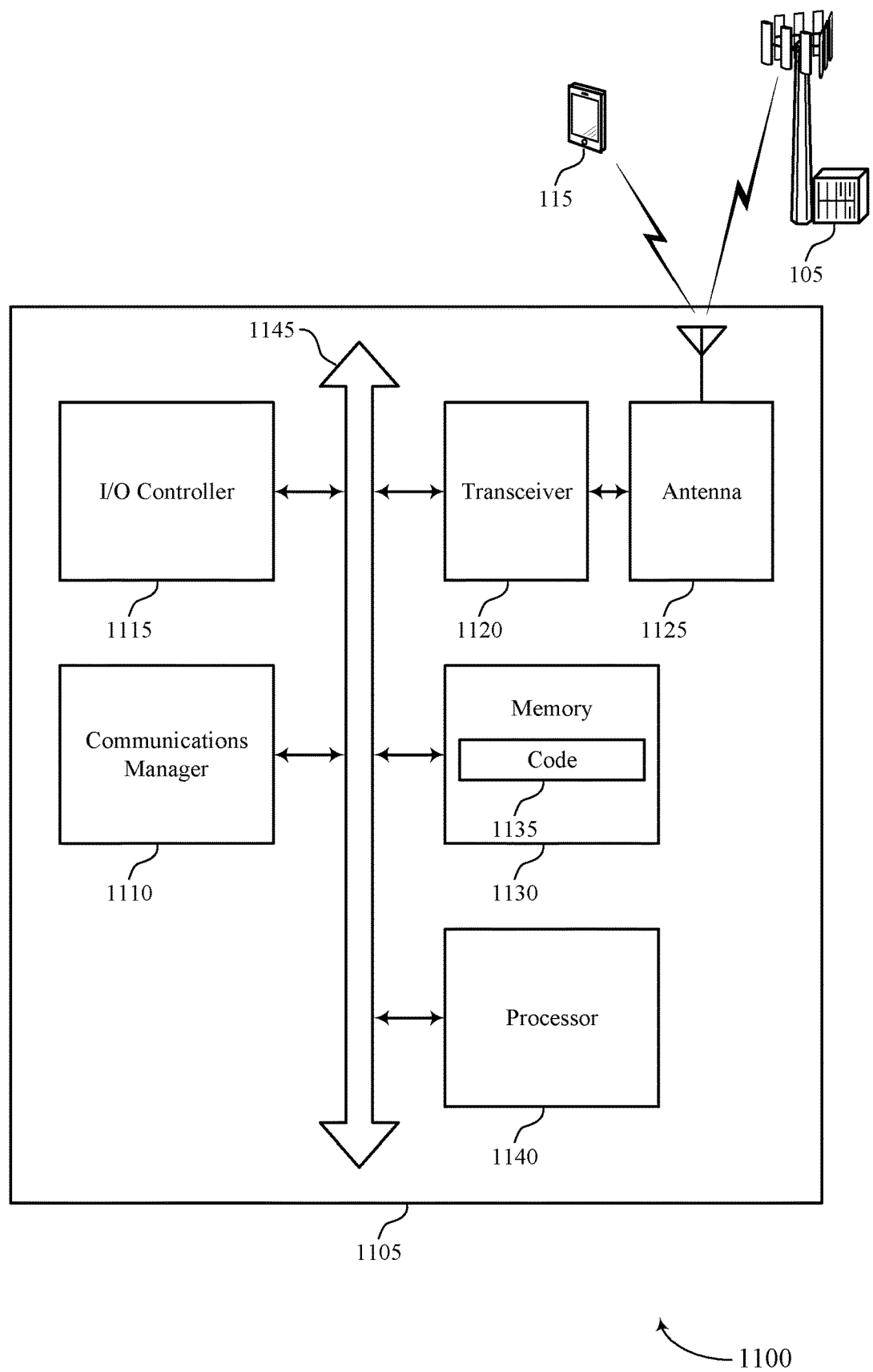
FIG. 11 shows a diagram of a system including a device that supports interference coordination in licensed shared radio frequency spectrum in accordance with aspects of the present disclosure.

FIG. 11 shows a diagram of a system 1100 including a device 1105 that supports interference coordination in licensed shared radio frequency spectrum in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, at a first node of a first network, configuration information for communicating with a second node of the first network via a shared radio frequency spectrum band, the configuration information including a network identification of the first network and a first priority of the first network relative to one or more other priorities of one or more other networks, measure a received signal strength of one or more other wireless nodes of the one or more other networks, determine a transmission power for one or more communications to the second node based on the received signal strength of the one or more other wireless nodes and the first priority of the first network, and transmit the one or more communications to the second node based on the determining.

The device 1105 may as described herein be implemented to realize one or more potential advantages. One implementation may allow the device 1105 to provide an indication of a network priority when transmitting reference signals, and to reduce associated transmit powers or refrain from transmissions when higher priority networks are detected, which may help reduce interference at nodes of neighboring networks, and thereby enhance reliability. Further, implementations may allow the device 1105 to utilize licensed shared radio frequency spectrum more efficiently, among other advantages.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting interference coordination in licensed shared radio frequency spectrum).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
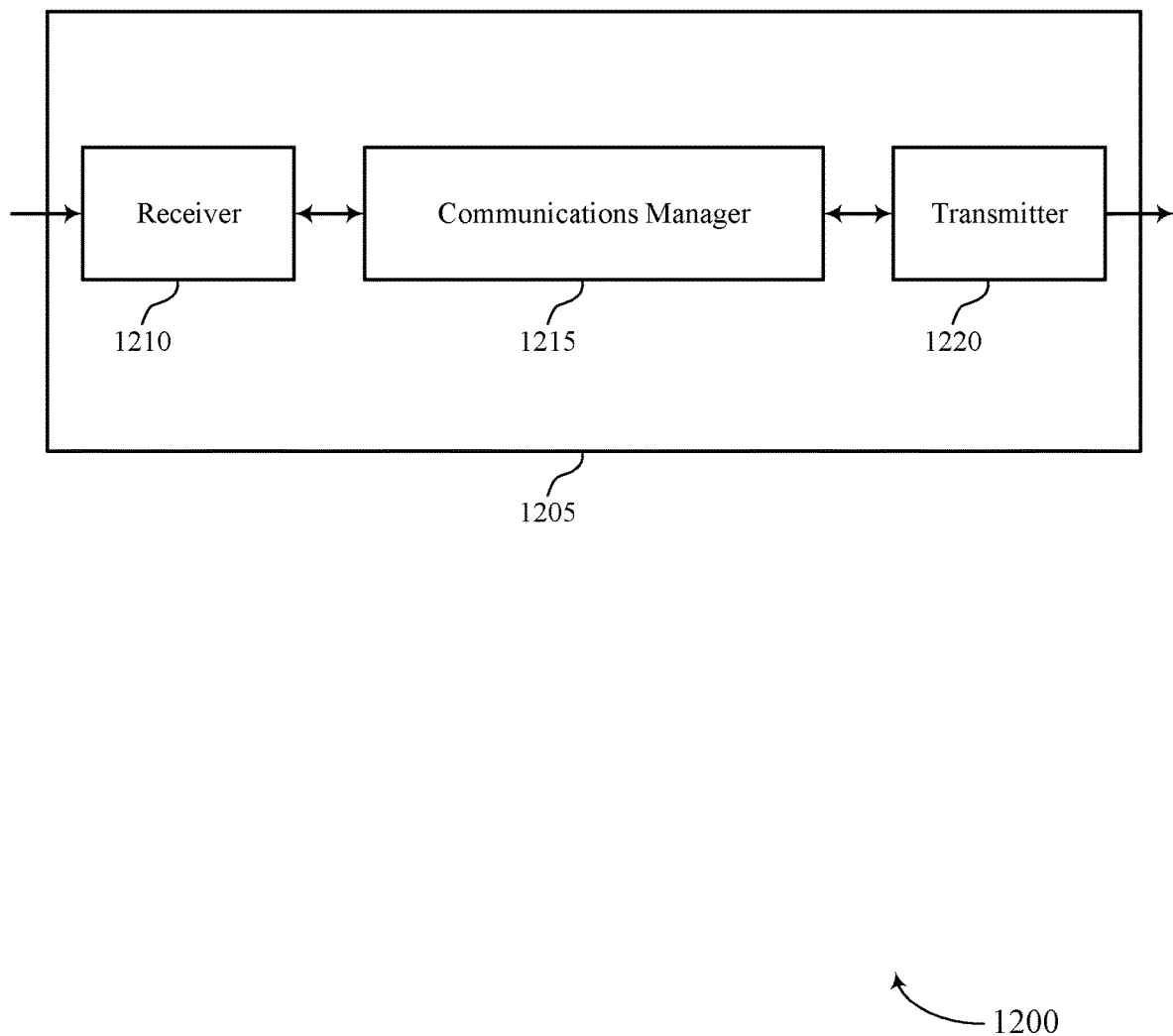
FIGS. 12 and 13 show block diagrams of devices that support interference coordination in licensed shared radio frequency spectrum in accordance with aspects of the present disclosure.

FIG. 12 shows a block diagram 1200 of a device 1205 that supports interference coordination in licensed shared radio frequency spectrum in accordance with aspects of the present disclosure. The device 1205 may be an example of aspects of a base station 105 or other wireless device as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to interference coordination in licensed shared radio frequency spectrum, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify, at a second node of a first network, configuration information for communications with at least a first node of the first network via a shared radio frequency spectrum band, the configuration information including a network identification of the first network and a first priority of the first network relative to one or more priorities of one or more other networks, measure a received signal strength of one or more other wireless nodes of the one or more other networks, determine a transmission power for one or more communications to the first node based on the received signal strength of the one or more other wireless nodes and the first priority of the first network, and transmit the one or more communications to the first node based on the determining. The one or more communications may be communications between any types nodes of a wireless communications system such as, for example, downlink communications from a base station to a UE, uplink communications from a UE to a base station, device-to-device communications between UEs or base stations, communications from an AP to a STA, communications from a STA to an AP, or communications from a router, repeater, relay, IAB node, or other network device. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
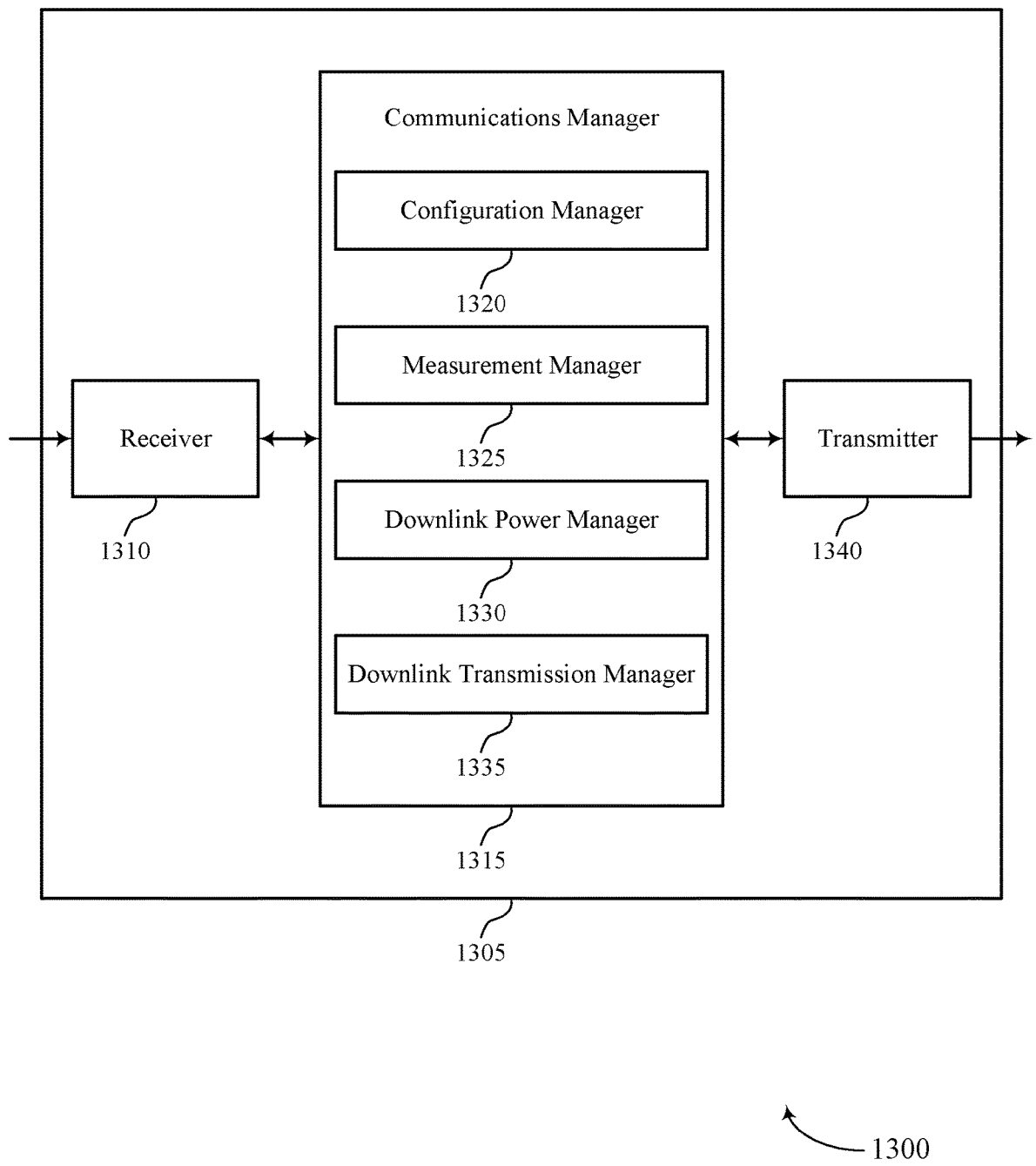

FIG. 13 shows a block diagram 1300 of a device 1305 that supports interference coordination in licensed shared radio frequency spectrum in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to interference coordination in licensed shared radio frequency spectrum, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration manager 1320, a measurement manager 1325, a downlink power manager 1330, and a downlink transmission manager 1335. The communications manager 1315 may be an example of aspects of the communications manager 1510 described herein.

The configuration manager 1320 may identify, at a second node of a first network, configuration information for communications with at least a first node of the first network via a shared radio frequency spectrum band, the configuration information including a network identification of the first network and a first priority of the first network relative to one or more priorities of one or more other networks.

The measurement manager 1325 may measure a received signal strength of one or more other wireless nodes of the one or more other networks.

The downlink power manager 1330 may determine a transmission power for one or more downlink communications to the first node based on the received signal strength of the one or more other wireless nodes and the first priority of the first network.

The downlink transmission manager 1335 may transmit the one or more downlink communications to the first node based on the determining.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
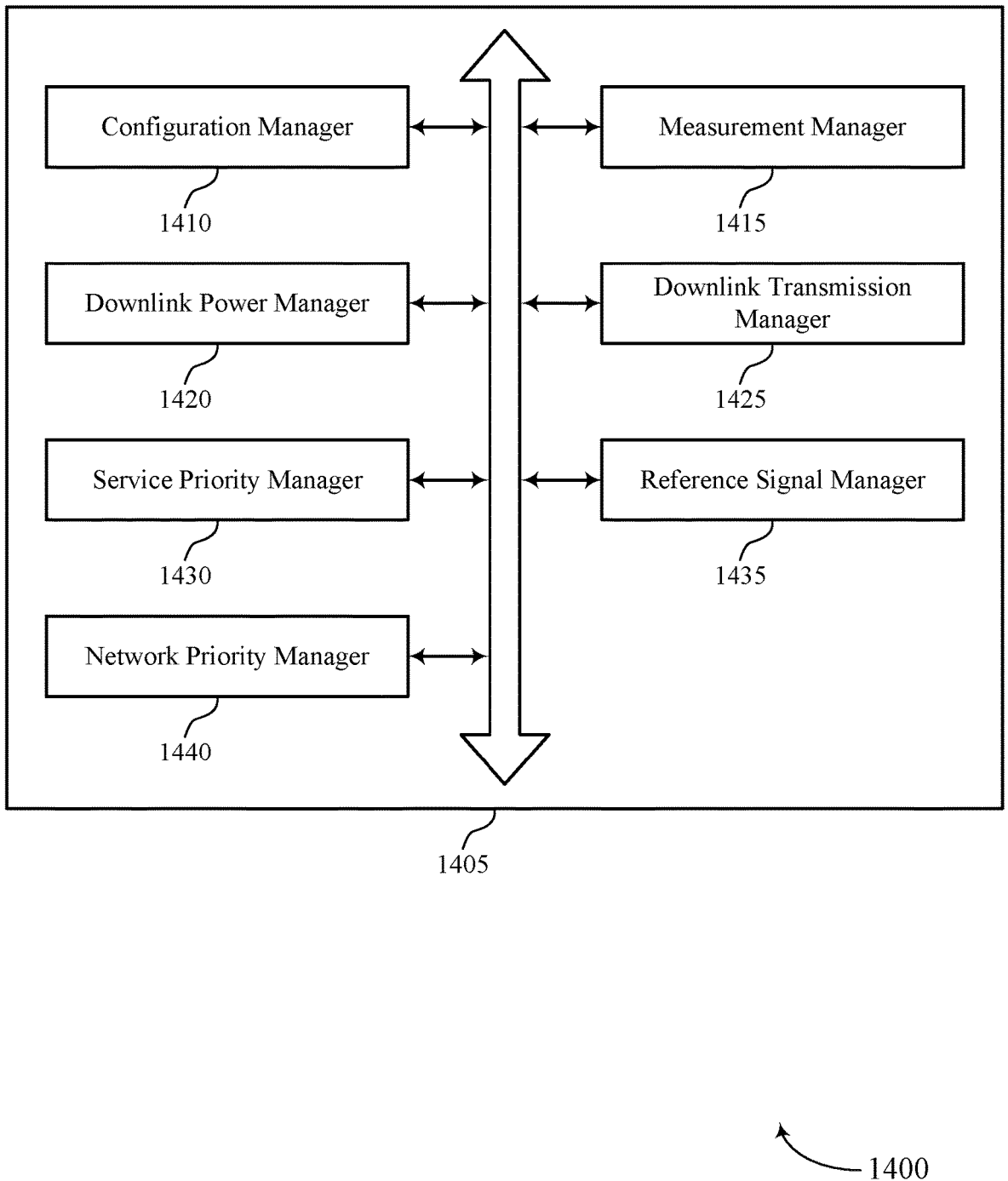
FIG. 14 shows a block diagram of a communications manager that supports interference coordination in licensed shared radio frequency spectrum in accordance with aspects of the present disclosure.

FIG. 14 shows a block diagram 1400 of a communications manager 1405 that supports interference coordination in licensed shared radio frequency spectrum in accordance with aspects of the present disclosure. The communications manager 1405 may be an example of aspects of a communications manager 1215, a communications manager 1315, or a communications manager 1510 described herein. The communications manager 1405 may include a configuration manager 1410, a measurement manager 1415, a downlink power manager 1420, a downlink transmission manager 1425, a service priority manager 1430, a reference signal manager 1435, and a network priority manager 1440. Each of these modules may communicate, directly or indirectly, with one another (e.g., via one or more buses).

The configuration manager 1410 may identify, at a second node of a first network, configuration information for communications with at least a first node of the first network via a shared radio frequency spectrum band, the configuration information including a network identification of the first network and a first priority of the first network relative to one or more other priorities of one or more other networks. In some examples, the configuration manager 1410 may transmit configuration information to the first node that indicates the first priority of the first network for use in determining a communication power for communications from the first node. In some cases, the configuration information further indicates a maximum allowed interference of the one or more other networks, and where the communication power is further determined based on the maximum allowed interference of the one or more other networks. In some cases, the configuration information further indicates synchronization information for frame synchronization among the first network and the one or more other networks.

The measurement manager 1415 may measure a received signal strength of one or more other wireless nodes of the one or more other networks. In some examples, the measurement manager 1415 may determine that a signal strength of the second reference signal exceeds a threshold value. In some examples, the measurement manager 1415 may determine that the received signal strength of the one or more other wireless nodes of the one or more other networks is below a threshold value or that a reservation signal from the one or more other networks is undetected.

The downlink power manager 1420 may determine a transmission power for one or more downlink communications to the first node based on the received signal strength of the one or more other wireless nodes and the first priority of the first network. In some examples, the downlink power manager 1420 may reduce the transmission power for the one or more downlink communications by a set amount based on the signal strength of the second reference signal and the higher priority of the second network.

In some examples, the downlink power manager 1420 may identify a set of signal strength thresholds, and where the reducing the transmission power for the one or more downlink communications is based on the signal strength of the second reference signal relative to the set of signal strength thresholds. In some examples, the downlink power manager 1420 may reduce the transmission power for the one or more downlink communications by a first reduction amount for downlink communications in a first frequency band that at least partially overlaps the first carrier frequency. In some examples, the downlink power manager 1420 may reduce the transmission power for the one or more downlink communications by a second reduction amount for downlink communications in a second frequency band that is adjacent to the first carrier frequency. In some examples, the downlink power manager 1420 may maintain a nominal transmission power for the one or more downlink communications in a third frequency band that is outside of a set range of the first carrier frequency.

In some examples, the downlink power manager 1420 may maintain a nominal transmission power for the one or more downlink communications irrespective of the first priority relative to the one or more other priorities in the absence of detecting channel occupancy of the one or more other networks.

In some cases, the transmission power for the one or more downlink communications is reduced for time resources, frequency resources, or combinations thereof, in which the one or more other networks have higher priority than the first network, and the transmission power for the one or more downlink communications is maintained at a nominal level for time resources, frequency resources, or combinations thereof, in which the first network has higher priority than the one or more other networks.

The downlink transmission manager 1425 may transmit the one or more downlink communications to the first node based on the determining. In some examples, the downlink transmission manager 1425 may refrain from transmitting downlink communications via the shared radio frequency spectrum band when the signal strength of the second reference signal exceeds a set limit.

The service priority manager 1430 may determine a service priority of a data channel to be transmitted to the first node, and where the transmission power is further determined based on the service priority relative to a set of service priorities.

The reference signal manager 1435 may configure the first node to indicate a first network identity of the first network in one or more reference signals transmitted by the first node. In some examples, the one or more reference signals include one or more of a remote interference management reference signal (RIM-RS) or an SRS.

The network priority manager 1440 may identify at least a first reference signal of the first node based on the first network identity indicated in the first reference signal. In some examples, the network priority manager 1440 may identify at least a second reference signal of a second network associated with one or more of the other wireless nodes based on a second network identity indicated in the second reference signal received at the second node. In some examples, the network priority manager 1440 may determine that the second network has a higher priority than the first network based on one or more of the first network identity or the second network identity. In some examples, the network priority manager 1440 may determine that a second network has a higher priority than the first network and has a first carrier frequency.

In some cases, the first priority is determined based on a priority configuration provided by a coexistence manager associated with the first network and the one or more other networks. In some cases, the priority configuration provided by the coexistence manager further indicates a maximum allowed interference of the one or more other networks, and where the transmission power for the one or more downlink communications is further determined based on the maximum allowed interference of the one or more other networks. In some cases, the first priority relative to the one or more other priorities of the one or more other networks is based on one or more of time resources or frequency resources, and where the time resources are determined based on the synchronization information.

Figure 15:
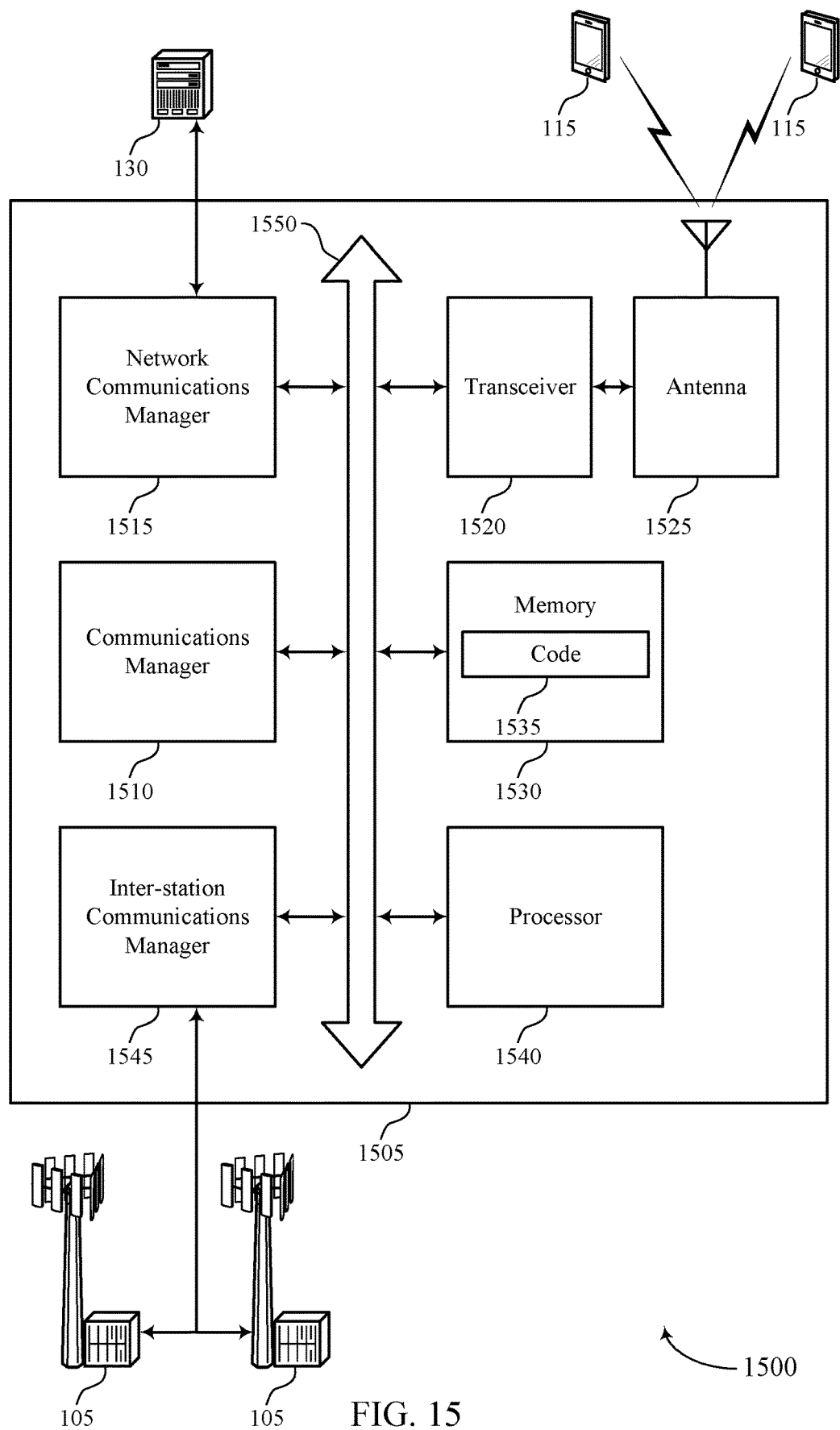
FIG. 15 shows a diagram of a system including a device that supports interference coordination in licensed shared radio frequency spectrum in accordance with aspects of the present disclosure.

FIG. 15 shows a diagram of a system 1500 including a device 1505 that supports interference coordination in licensed shared radio frequency spectrum in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify, at a second node of a first network, configuration information for communications with at least a first node of the first network via a shared radio frequency spectrum band, the configuration information including a network identification of the first network and a first priority of the first network relative to one or more other priorities of one or more other networks, measure a received signal strength of one or more other wireless nodes of the one or more other networks, determine a transmission power for one or more communications to the first node based on the received signal strength of the one or more other wireless nodes and the first priority of the first network, and transmit the one or more communications to the first node based on the determining.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting interference coordination in licensed shared radio frequency spectrum).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
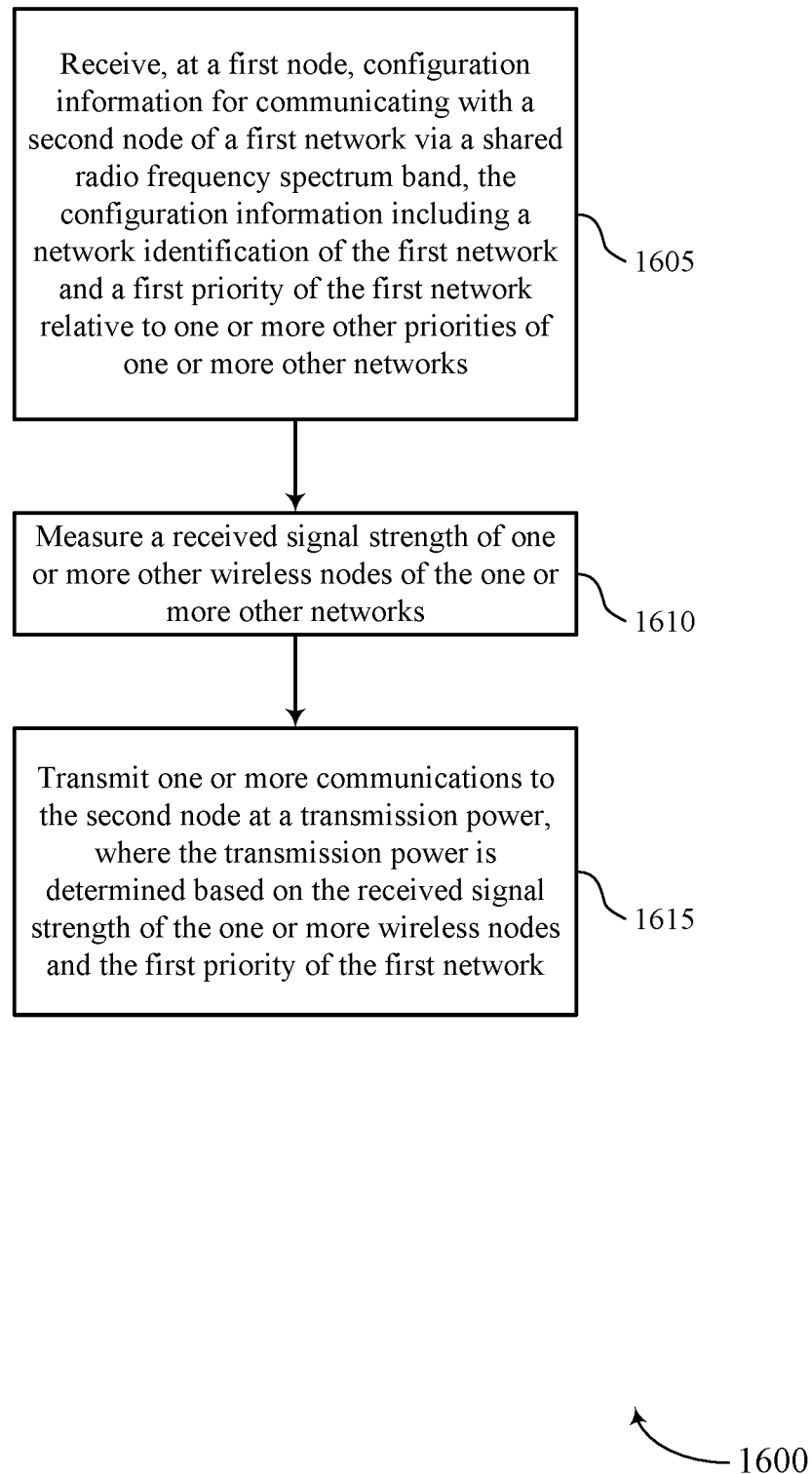
FIGS. 16 through 22 show flowcharts illustrating methods that support interference coordination in licensed shared radio frequency spectrum in accordance with aspects of the present disclosure.

FIG. 16 shows a flowchart illustrating a method 1600 that supports interference coordination in licensed shared radio frequency spectrum in accordance with aspects of the present disclosure. The operations of method 1600 may be implemented by a wireless node (e.g., a UE 115) or its components as described herein. For example, the operations of method 1600 may be performed by a communications manager of a first node of a first network as described with reference to FIGS. 8 through 11. In some examples, a first node may execute a set of instructions to control the functional elements of the first node to perform the functions described below. Additionally or alternatively, a first node may perform aspects of the functions described below using special-purpose hardware.

At 1605, the first node may receive configuration information for communicating with a second node of the first network via a shared radio frequency spectrum band, the configuration information including a network identification of the first network and a first priority of the first network relative to one or more other priorities of one or more other networks. The operations of 1605 may be performed according to the methods described herein. In some examples, aspects of the operations of 1605 may be performed by a configuration manager as described with reference to FIGS. 8 through 11.

At 1610, the first node may measure a received signal strength of one or more other wireless nodes of the one or more other networks. The operations of 1610 may be performed according to the methods described herein. In some examples, aspects of the operations of 1610 may be performed by a measurement manager as described with reference to FIGS. 8 through 11.

At 1615, the first node may transmit one or more communications to the second node at a transmission power, where the transmission power is determined based on the received signal strength of the one or more other wireless nodes and the first priority of the first network. The operations of 1615 may be performed according to the methods described herein. In some examples, aspects of the operations of 1615 may be performed by an uplink power manager as described with reference to FIGS. 8 through 11.

Figure 17:
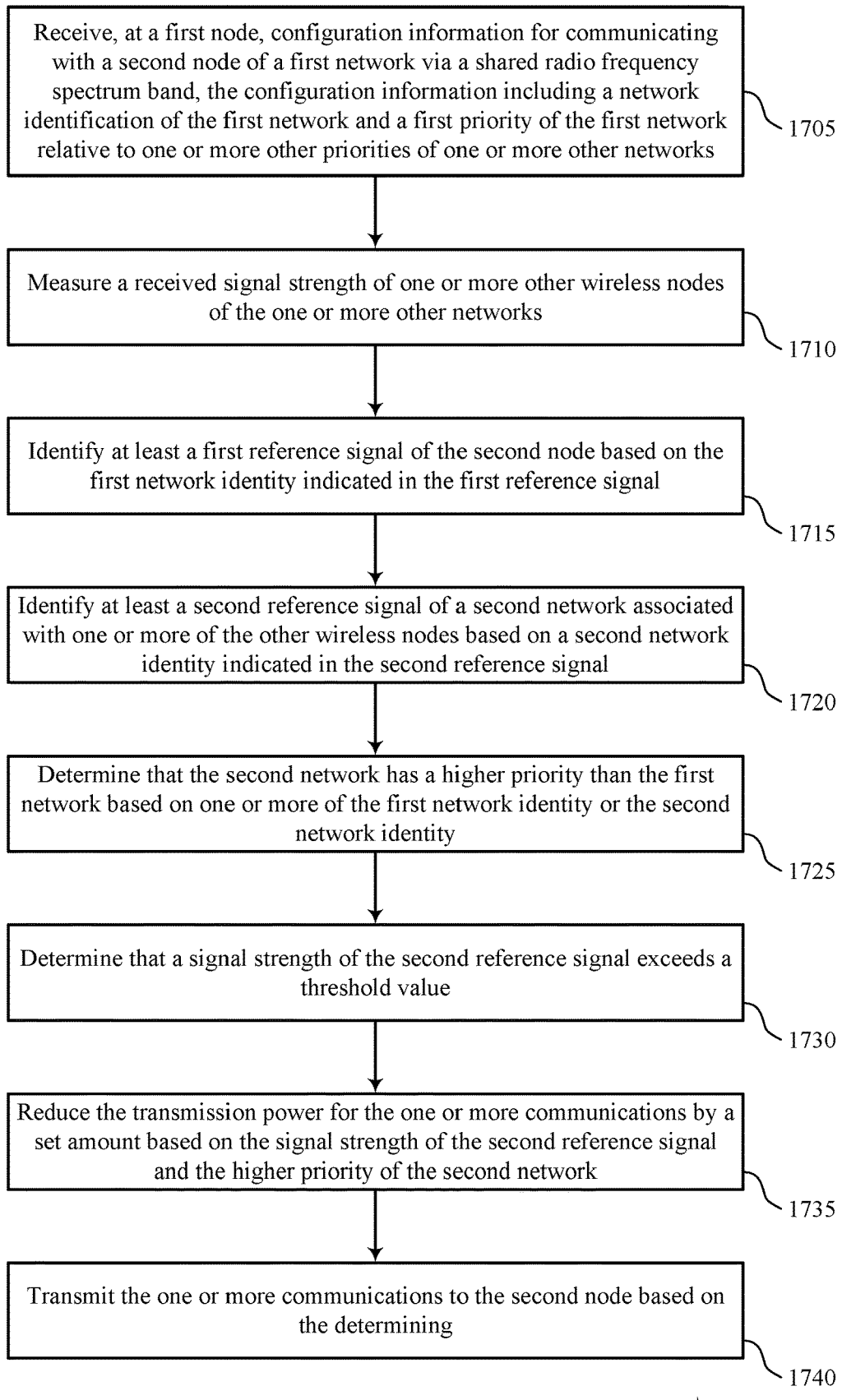

FIG. 17 shows a flowchart illustrating a method 1700 that supports interference coordination in licensed shared radio frequency spectrum in accordance with aspects of the present disclosure. The operations of method 1700 may be implemented by a wireless node (e.g., a UE 115) or its components as described herein. For example, the operations of method 1700 may be performed by a communications manager of a first node of a first network as described with reference to FIGS. 8 through 11. In some examples, a first node may execute a set of instructions to control the functional elements of the first node to perform the functions described below. Additionally or alternatively, a first node may perform aspects of the functions described below using special-purpose hardware.

At 1705, the first node may receive configuration information for communicating with a second node of the first network via a shared radio frequency spectrum band, the configuration information including a network identification of the first network and a first priority of the first network relative to one or more other priorities of one or more other networks. The operations of 1705 may be performed according to the methods described herein. In some examples, aspects of the operations of 1705 may be performed by a configuration manager as described with reference to FIGS. 8 through 11. In some cases, the configuration information includes a first network identity of the first network that is indicated in one or more reference signals transmitted from the one or more base stations of the first network, and where the method further includes.

At 1710, the first node may measure a received signal strength of one or more other wireless nodes of the one or more other networks. The operations of 1710 may be performed according to the methods described herein. In some examples, aspects of the operations of 1710 may be performed by a measurement manager as described with reference to FIGS. 8 through 11.

At 1715, the first node may identify at least a first reference signal of the second node based on the first network identity indicated in the first reference signal. The operations of 1715 may be performed according to the methods described herein. In some examples, aspects of the operations of 1715 may be performed by a reference signal manager as described with reference to FIGS. 8 through 11.

At 1720, the first node may identify at least a second reference signal of a second network associated with one or more of the other wireless nodes based on a second network identity indicated in the second reference signal. The operations of 1720 may be performed according to the methods described herein. In some examples, aspects of the operations of 1720 may be performed by a reference signal manager as described with reference to FIGS. 8 through 11.

At 1725, the first node may determine that the second network has a higher priority than the first network based on one or more of the first network identity or the second network identity. The operations of 1725 may be performed according to the methods described herein. In some examples, aspects of the operations of 1725 may be performed by a network priority manager as described with reference to FIGS. 8 through 11.

At 1730, the first node may determine that a signal strength of the second reference signal exceeds a threshold value. The operations of 1730 may be performed according to the methods described herein. In some examples, aspects of the operations of 1730 may be performed by a reference signal manager as described with reference to FIGS. 8 through 11.

At 1735, the first node may reduce the transmission power for the one or more communications by a set amount based on the signal strength of the second reference signal and the higher priority of the second network. The operations of 1735 may be performed according to the methods described herein. In some examples, aspects of the operations of 1735 may be performed by an uplink power manager as described with reference to FIGS. 8 through 11. In some cases, the UE may refrain from transmitting communications via the shared radio frequency spectrum band when the signal strength of the second reference signal exceeds a set limit.

At 1740, the first node may transmit the one or more communications to the second node based on the determining. The operations of 1740 may be performed according to the methods described herein. In some examples, aspects of the operations of 1740 may be performed by an uplink transmission manager as described with reference to FIGS. 8 through 11.

Figure 18:
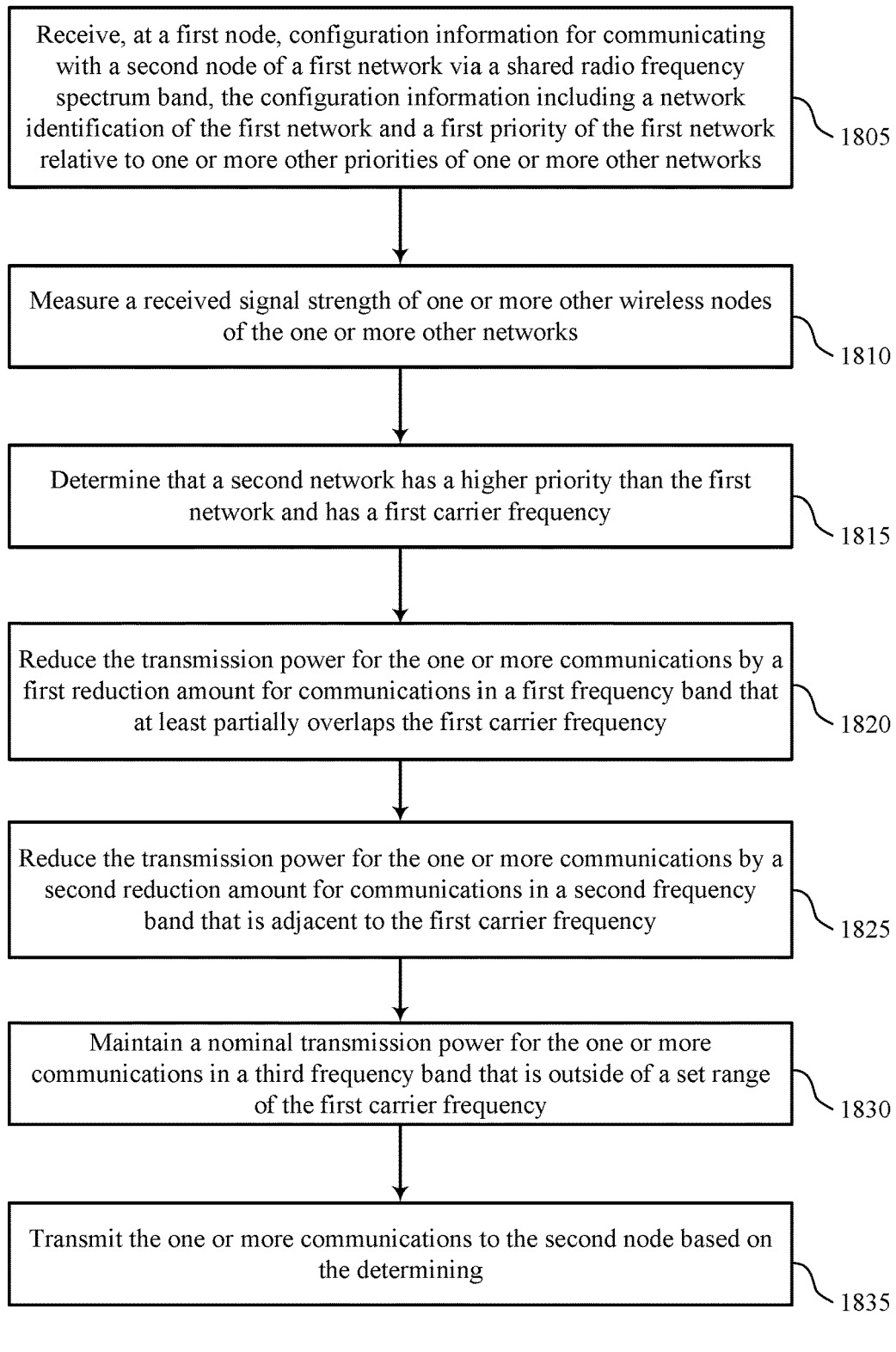

FIG. 18 shows a flowchart illustrating a method 1800 that supports interference coordination in licensed shared radio frequency spectrum in accordance with aspects of the present disclosure. The operations of method 1800 may be implemented by a wireless node (e.g., a UE 115) or its components as described herein. For example, the operations of method 1800 may be performed by a communications manager of a first node of a first network as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the first node may receive configuration information for communicating with a second node of the first network via a shared radio frequency spectrum band, the configuration information including a network identification of the first network and a first priority of the first network relative to one or more other priorities of one or more other networks. The operations of 1805 may be performed according to the methods described herein. In some examples, aspects of the operations of 1805 may be performed by a configuration manager as described with reference to FIGS. 8 through 11.

At 1810, the first node may measure a received signal strength of one or more other wireless nodes of the one or more other networks. The operations of 1810 may be performed according to the methods described herein. In some examples, aspects of the operations of 1810 may be performed by a measurement manager as described with reference to FIGS. 8 through 11.

At 1815, the first node may determine that a second network has a higher priority than the first network and has a first carrier frequency. The operations of 1815 may be performed according to the methods described herein. In some examples, aspects of the operations of 1815 may be performed by a network priority manager as described with reference to FIGS. 8 through 11.

At 1820, the first node may reduce the transmission power for the one or more communications by a first reduction amount for communications in a first frequency band that at least partially overlaps the first carrier frequency. The operations of 1820 may be performed according to the methods described herein. In some examples, aspects of the operations of 1820 may be performed by an uplink power manager as described with reference to FIGS. 8 through 11.

At 1825, the first node may reduce the transmission power for the one or more communications by a second reduction amount for communications in a second frequency band that is adjacent to the first carrier frequency. The operations of 1825 may be performed according to the methods described herein. In some examples, aspects of the operations of 1825 may be performed by an uplink power manager as described with reference to FIGS. 8 through 11.

At 1830, the first node may maintain a nominal transmission power for the one or more communications in a third frequency band that is outside of a set range of the first carrier frequency. The operations of 1830 may be performed according to the methods described herein. In some examples, aspects of the operations of 1830 may be performed by an uplink power manager as described with reference to FIGS. 8 through 11.

At 1835, the first node may transmit the one or more communications to the second node based on the determining. The operations of 1835 may be performed according to the methods described herein. In some examples, aspects of the operations of 1835 may be performed by an uplink transmission manager as described with reference to FIGS. 8 through 11.

Figure 19:
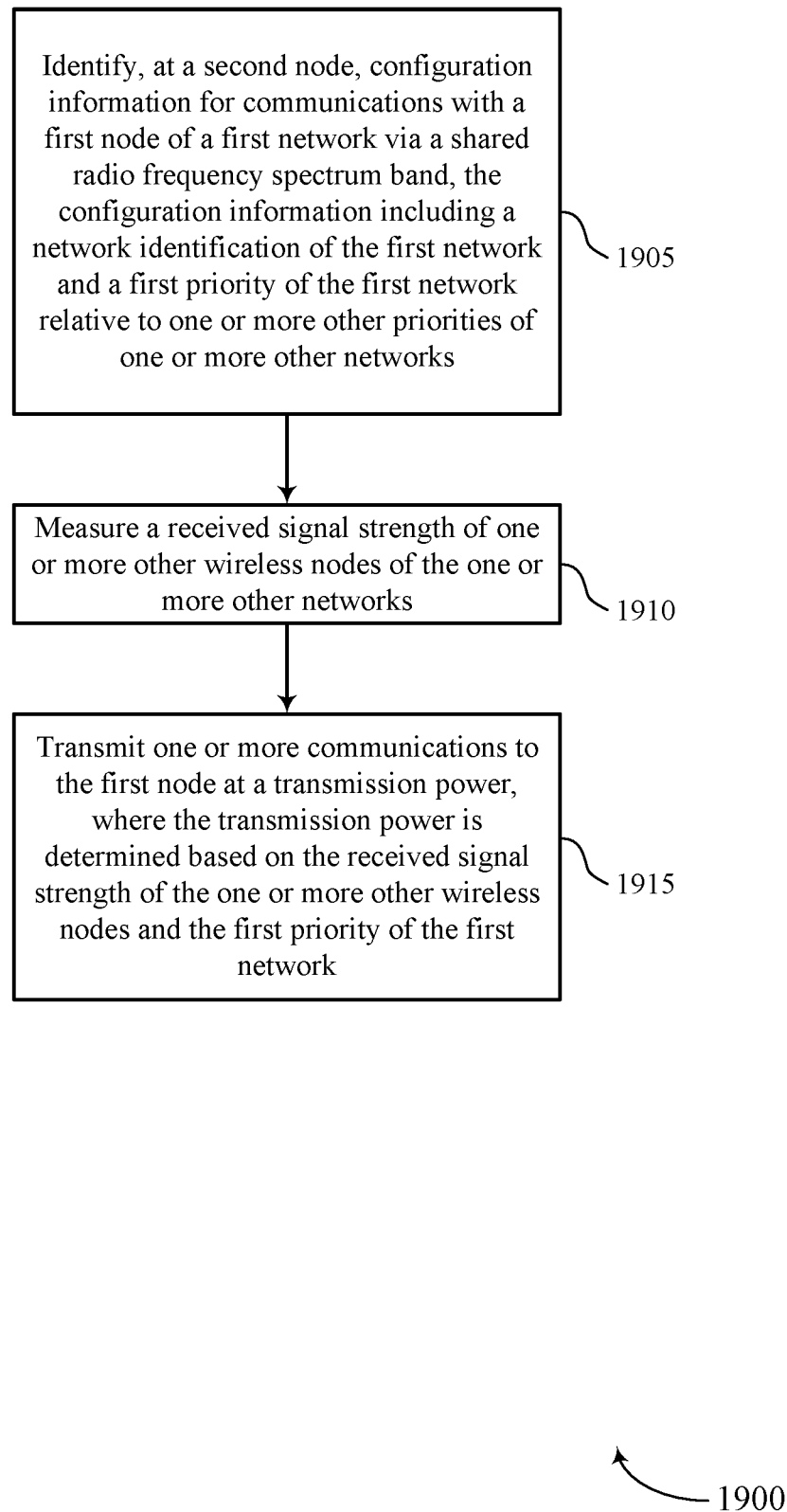

FIG. 19 shows a flowchart illustrating a method 1900 that supports interference coordination in licensed shared radio frequency spectrum in accordance with aspects of the present disclosure. The operations of method 1900 may be implemented by a wireless node (e.g., a base station 105) or its components as described herein. For example, the operations of method 1900 may be performed by a communications manager of a second node of a first network as described with reference to FIGS. 12 through 15. In some examples, a second node may execute a set of instructions to control the functional elements of the second node to perform the functions described below. Additionally or alternatively, a second node may perform aspects of the functions described below using special-purpose hardware.

At 1905, the second node may identify configuration information for communications with at least a first node of the first network via a shared radio frequency spectrum band, the configuration information including a network identification of the first network and a first priority of the first network relative to one or more other priorities of one or more other networks. The operations of 1905 may be performed according to the methods described herein. In some examples, aspects of the operations of 1905 may be performed by a configuration manager as described with reference to FIGS. 12 through 15.

At 1910, the second node may measure a received signal strength of one or more other wireless nodes of the one or more other networks. The operations of 1910 may be performed according to the methods described herein. In some examples, aspects of the operations of 1910 may be performed by a measurement manager as described with reference to FIGS. 12 through 15.

At 1915, the second node may transmit one or more communications to the first node at a transmission power, where the transmission power is determined based on the received signal strength of the one or more other wireless nodes and the first priority of the first network. The operations of 1915 may be performed according to the methods described herein. In some examples, aspects of the operations of 1915 may be performed by a downlink power manager as described with reference to FIGS. 12 through 15.

Figure 20:
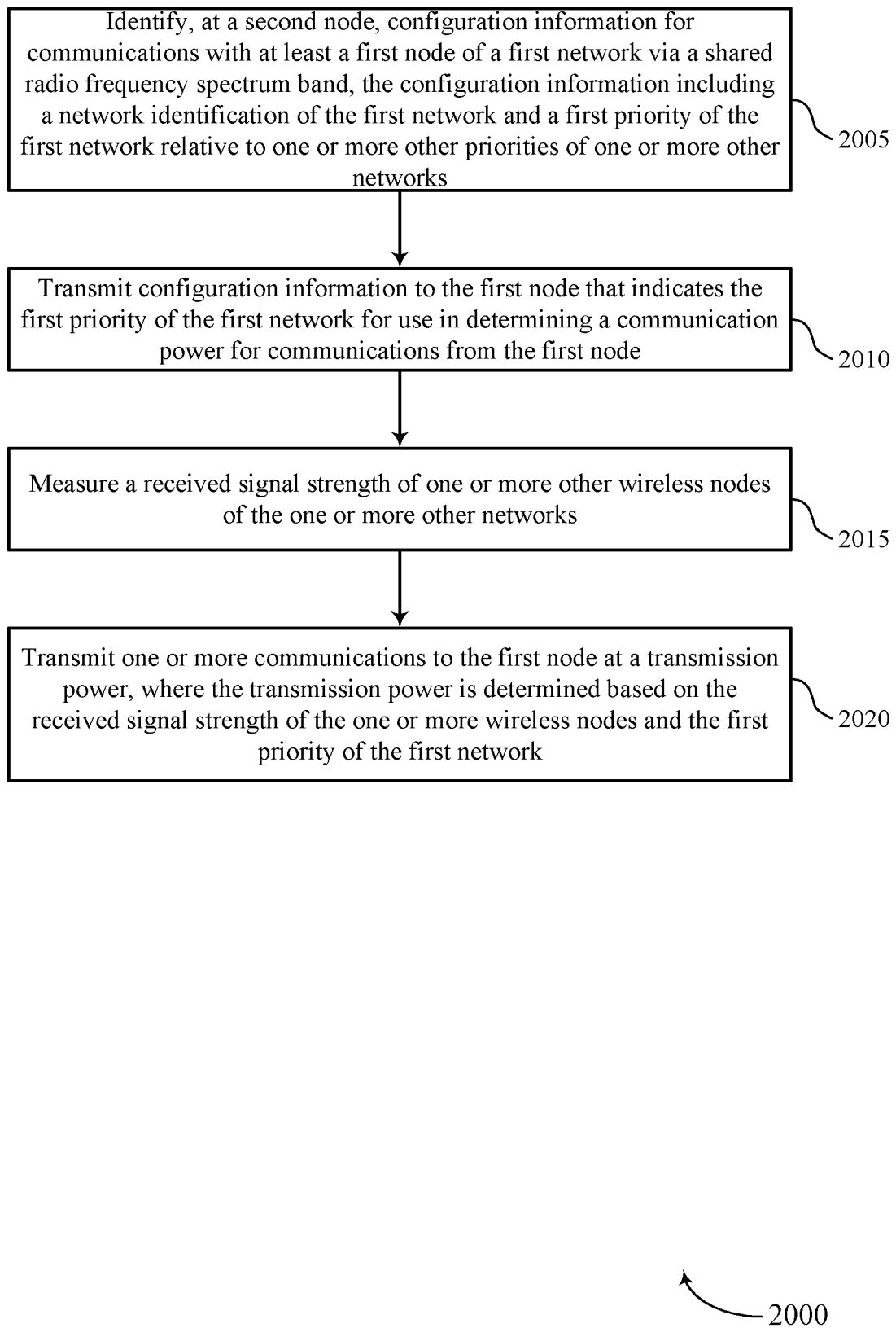

FIG. 20 shows a flowchart illustrating a method 2000 that supports interference coordination in licensed shared radio frequency spectrum in accordance with aspects of the present disclosure. The operations of method 2000 may be implemented by a wireless node (e.g., a base station 105) or its components as described herein. For example, the operations of method 2000 may be performed by a communications manager of a second node of a first network as described with reference to FIGS. 12 through 15. In some examples, a second node may execute a set of instructions to control the functional elements of the second node to perform the functions described below. Additionally or alternatively, a second node may perform aspects of the functions described below using special-purpose hardware.

At 2005, the second node may identify configuration information for communications with at least a first node of the first network via a shared radio frequency spectrum band, the configuration information including a network identification of the first network and a first priority of the first network relative to one or more other priorities of one or more other networks. The operations of 2005 may be performed according to the methods described herein. In some examples, aspects of the operations of 2005 may be performed by a configuration manager as described with reference to FIGS. 12 through 15.

At 2010, the second node may transmit configuration information to the first node that indicates the first priority of the first network for use in determining a communication power for communications from the first node. The operations of 2010 may be performed according to the methods described herein. In some examples, aspects of the operations of 2010 may be performed by a configuration manager as described with reference to FIGS. 12 through 15.

At 2015, the second node may measure a received signal strength of one or more other wireless nodes of the one or more other networks. The operations of 2015 may be performed according to the methods described herein. In some examples, aspects of the operations of 2015 may be performed by a measurement manager as described with reference to FIGS. 12 through 15.

At 2020, the second node may transmit one or more communications to the first node at a transmission power, where the transmission power is determined based on the received signal strength of the one or more other wireless nodes and the first priority of the first network. The operations of 2020 may be performed according to the methods described herein. In some examples, aspects of the operations of 2020 may be performed by a downlink power manager as described with reference to FIGS. 12 through 15.

Figure 21:
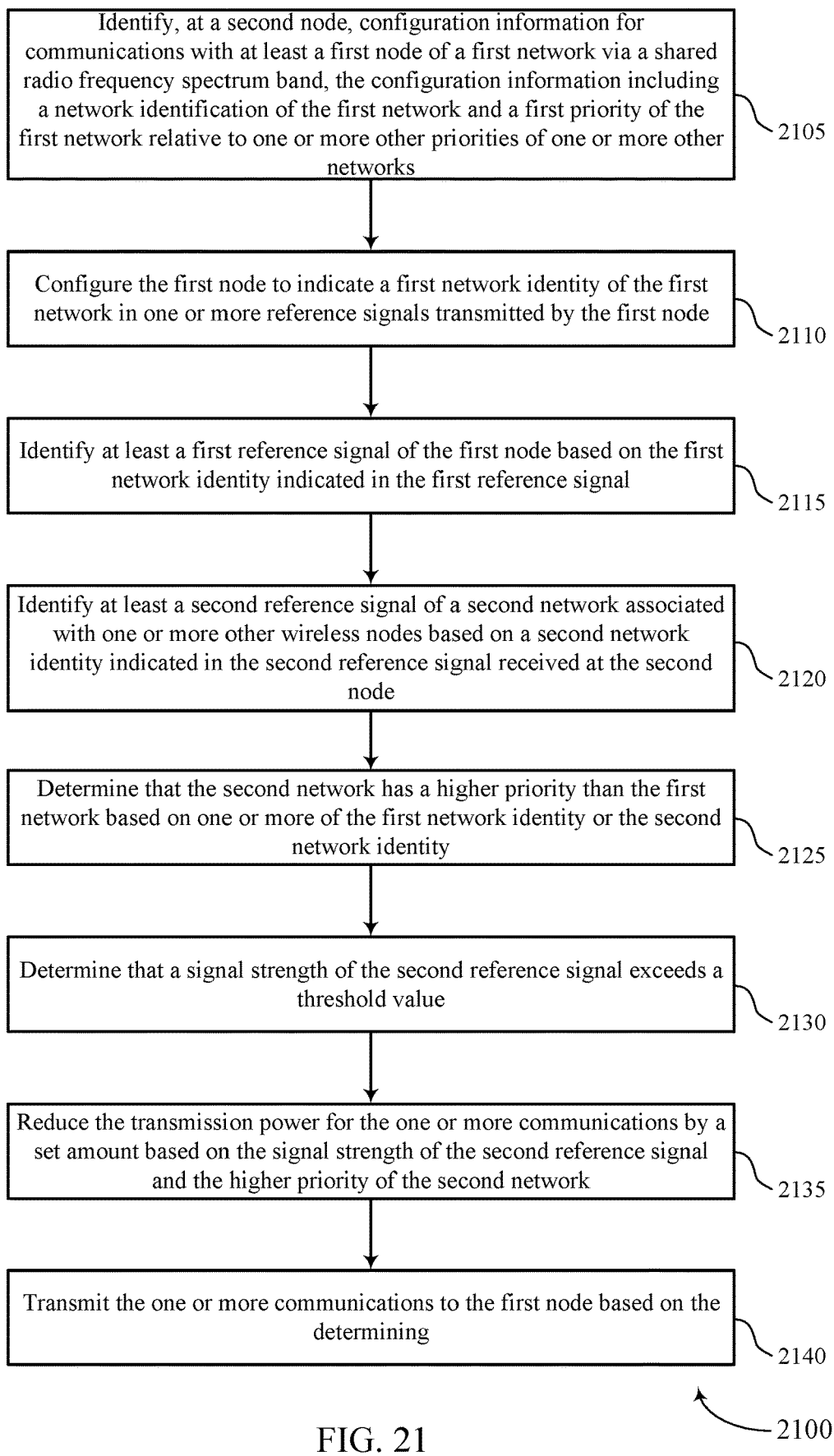

FIG. 21 shows a flowchart illustrating a method 2100 that supports interference coordination in licensed shared radio frequency spectrum in accordance with aspects of the present disclosure. The operations of method 2100 may be implemented by a wireless node (e.g., a base station 105) or its components as described herein. For example, the operations of method 2100 may be performed by a communications manager of a second node of a first network as described with reference to FIGS. 12 through 15. In some examples, a second node may execute a set of instructions to control the functional elements of the second node to perform the functions described below. Additionally or alternatively, a second node may perform aspects of the functions described below using special-purpose hardware.

At 2105, the second node may identify configuration information for communications with at least a first node of the first network via a shared radio frequency spectrum band, the configuration information including a network identification of the first network and a first priority of the first network relative to one or more other priorities of one or more other networks. The operations of 2105 may be performed according to the methods described herein. In some examples, aspects of the operations of 2105 may be performed by a configuration manager as described with reference to FIGS. 12 through 15.

At 2110, the second node may configure the first node to indicate a first network identity of the first network in one or more reference signals transmitted by the first node. The operations of 2110 may be performed according to the methods described herein. In some examples, aspects of the operations of 2110 may be performed by a reference signal manager as described with reference to FIGS. 12 through 15.

At 2115, the second node may identify at least a first reference signal of the first node based on the first network identity indicated in the first reference signal. The operations of 2115 may be performed according to the methods described herein. In some examples, aspects of the operations of 2115 may be performed by a network priority manager as described with reference to FIGS. 12 through 15.

At 2120, the second node may identify at least a second reference signal of a second network associated with one or more of the other wireless nodes based on a second network identity indicated in the second reference signal received at the second node. The operations of 2120 may be performed according to the methods described herein. In some examples, aspects of the operations of 2120 may be performed by a network priority manager as described with reference to FIGS. 12 through 15.

At 2125, the second node may determine that the second network has a higher priority than the first network based on one or more of the first network identity or the second network identity. The operations of 2125 may be performed according to the methods described herein. In some examples, aspects of the operations of 2125 may be performed by a network priority manager as described with reference to FIGS. 12 through 15.

At 2130, the second node may determine that a signal strength of the second reference signal exceeds a threshold value. The operations of 2130 may be performed according to the methods described herein. In some examples, aspects of the operations of 2130 may be performed by a measurement manager as described with reference to FIGS. 12 through 15.

At 2135, the second node may reduce the transmission power for the one or more downlink communications by a set amount based on the signal strength of the second reference signal and the higher priority of the second network. The operations of 2135 may be performed according to the methods described herein. In some examples, aspects of the operations of 2135 may be performed by a downlink power manager as described with reference to FIGS. 12 through 15.

At 2140, the second node may transmit the one or more communications to the first node based on the determining. The operations of 2140 may be performed according to the methods described herein. In some examples, aspects of the operations of 2140 may be performed by a downlink transmission manager as described with reference to FIGS. 12 through 15.

Figure 22:
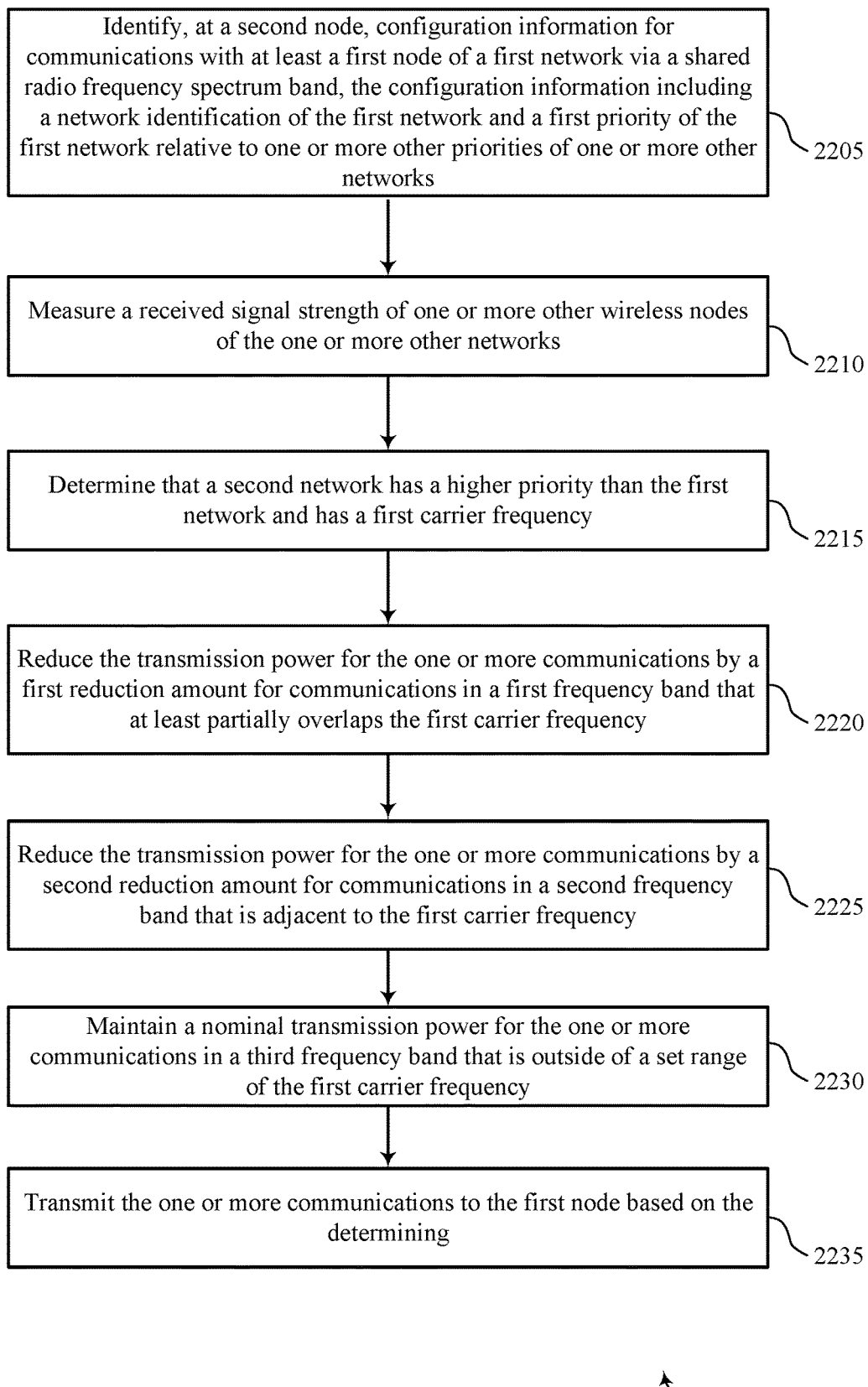

FIG. 22 shows a flowchart illustrating a method 2200 that supports interference coordination in licensed shared radio frequency spectrum in accordance with aspects of the present disclosure. The operations of method 2200 may be implemented by a wireless node (e.g., a base station 105) or its components as described herein. For example, the operations of method 2200 may be performed by a communications manager of a second node of a first network as described with reference to FIGS. 12 through 15. In some examples, a second node may execute a set of instructions to control the functional elements of the second node to perform the functions described below. Additionally or alternatively, a second node may perform aspects of the functions described below using special-purpose hardware.

At 2205, the second node may identify configuration information for communications with at least a first node of the first network via a shared radio frequency spectrum band, the configuration information including a network identification of the first network and a first priority of the first network relative to one or more other priorities of one or more other networks. The operations of 2205 may be performed according to the methods described herein. In some examples, aspects of the operations of 2205 may be performed by a configuration manager as described with reference to FIGS. 12 through 15.

At 2210, the second node may measure a received signal strength of one or more other wireless nodes of the one or more other networks. The operations of 2210 may be performed according to the methods described herein. In some examples, aspects of the operations of 2210 may be performed by a measurement manager as described with reference to FIGS. 12 through 15.

At 2215, the second node may determine that a second network has a higher priority than the first network and has a first carrier frequency. The operations of 2215 may be performed according to the methods described herein. In some examples, aspects of the operations of 2215 may be performed by a network priority manager as described with reference to FIGS. 12 through 15.

At 2220, the second node may reduce the transmission power for the one or more communications by a first reduction amount for communications in a first frequency band that at least partially overlaps the first carrier frequency. The operations of 2220 may be performed according to the methods described herein. In some examples, aspects of the operations of 2220 may be performed by a downlink power manager as described with reference to FIGS. 12 through 15.

At 2225, the second node may reduce the transmission power for the one or more communications by a second reduction amount for communications in a second frequency band that is adjacent to the first carrier frequency. The operations of 2225 may be performed according to the methods described herein. In some examples, aspects of the operations of 2225 may be performed by a downlink power manager as described with reference to FIGS. 12 through 15.

At 2230, the second node may maintain a nominal transmission power for the one or more communications in a third frequency band that is outside of a set range of the first carrier frequency. The operations of 2230 may be performed according to the methods described herein. In some examples, aspects of the operations of 2230 may be performed by a downlink power manager as described with reference to FIGS. 12 through 15.

At 2235, the second node may transmit the one or more communications to the first node based on the determining. The operations of 2235 may be performed according to the methods described herein. In some examples, aspects of the operations of 2235 may be performed by a downlink transmission manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first node of a first network, comprising: receiving configuration information for communicating with a second node of the first network via a shared radio frequency spectrum band, the configuration information including a network identification of the first network and a first priority of the first network relative to one or more other priorities of one or more other networks; measuring a received signal strength of one or more other wireless nodes of the one or more other networks; transmitting one or more communications to the second node at a transmission power, wherein the transmission power is determined based at least in part on the received signal strength of the one or more other wireless nodes and the first priority of the first network.

Aspect 2: The method of aspect 1, wherein the determining the transmission power further comprises: determining a service priority of a data channel to be transmitted to the second node, and wherein the transmission power is further determined based at least in part on the service priority relative to a plurality of service priorities.

Aspect 3: The method of any of aspects 1 through 2, wherein the first node is one of a UE, a base station, an AP, or an STA, and the second node is one of a UE, a base station, an AP, or a STA.

Aspect 4: The method of any of aspects 1 through 3, wherein the configuration information includes a first network identity of the first network that is indicated in one or more reference signals transmitted from nodes of the first network, and wherein the method further comprises; identifying at least a first reference signal of the second node based at least in part on the first network identity indicated in the first reference signal; and identifying at least a second reference signal of a second network associated with one or more of the other wireless nodes based at least in part on a second network identity indicated in the second reference signal.

Aspect 5: The method of aspect 4, wherein the one or more reference signals include one or more of a remote interference management reference signal (RIM-RS) or an SRS.

Aspect 6: The method of any of aspects 4 through 5, further comprising: determining that the second network has a higher priority than the first network based at least in part on one or more of the first network identity or the second network identity; determining that a signal strength of the second reference signal exceeds a threshold value; and reducing the transmission power for the one or more communications by a set amount based at least in part on the signal strength of the second reference signal and the higher priority of the second network.

Aspect 7: The method of aspect 6, further comprising: refraining from transmitting communications via the shared radio frequency spectrum band when the signal strength of the second reference signal exceeds a set limit.

Aspect 8: The method of any of aspects 6 through 7, further comprising: identifying a plurality of signal strength thresholds, and wherein the reducing the transmission power for the one or more communications is based at least in part on the signal strength of the second reference signal relative to the plurality of signal strength thresholds.

Aspect 9: The method of any of aspects 1 through 5, wherein the determining the transmission power further comprises: determining that the second network has a higher priority than the first network and has a first carrier frequency; reducing the transmission power for the one or more communications by a first reduction amount for communications in a first frequency band that at least partially overlaps the first carrier frequency; reducing the transmission power for the one or more communications by a second reduction amount for communications in a second frequency band that is adjacent to the first carrier frequency; and maintaining a nominal transmission power for the one or more communications in a third frequency band that is outside of a set range of the first carrier frequency.

Aspect 10: The method of any of aspects 1 through 9, wherein the first priority is determined based at least in part on a priority configuration provided by a coexistence manager associated with the first network and the one or more other networks.

Aspect 11: The method of any of aspects 1 through 10, wherein the configuration information further indicates a maximum allowed interference of the one or more other networks, and the transmission power is further determined based at least in part on the maximum allowed interference of the one or more other networks.

Aspect 12: The method of any of aspects 1 through 11, wherein the configuration information further indicates synchronization information for frame synchronization among the first network and the one or more other networks.

Aspect 13: The method of aspect 12, wherein the first priority relative to the one or more other priorities of the one or more other networks is based at least in part on one or more of time resources or frequency resources, and the time resources are determined based at least in part on the synchronization information.

Aspect 14: The method of aspect 13, wherein the transmission power for the one or more communications is reduced for time resources, frequency resources, or combinations thereof, in which the one or more other networks have higher priority than the first network, and the transmission power for the one or more communications is maintained at a nominal level for time resources, frequency resources, or combinations thereof, in which the first network has higher priority than the one or more other networks.

Aspect 15: The method of any of aspects 1 through 14, wherein the determining the transmission power for the one or more communications further comprises: determining that the received signal strength of the one or more other wireless nodes of the one or more other networks is below a threshold value or that a reservation signal from the one or more other networks is undetected; and maintaining a nominal transmission power for the one or more communications irrespective of the first priority relative to the one or more other priorities.

Aspect 16: A method for wireless communication at a second node of a first network, comprising: identifying configuration information for communications with at least a first node of the first network via a shared radio frequency spectrum band, the configuration information including a network identification of the first network and a first priority of the first network relative to one or more other priorities of one or more other networks; measuring a received signal strength of one or more other wireless nodes of the one or more other networks; transmitting one or more communications to the first node at a transmission power, wherein the transmission power is determined based at least in part on the received signal strength of the one or more other wireless nodes and the first priority of the first network.

Aspect 17: The method of aspect 16, wherein the first node is one of a UE, a base station, an AP, or an STA, and the second node is one of a UE, a base station, an AP, or a STA.

Aspect 18: The method of any of aspects 16 through 17, further comprising: transmitting configuration information to the first node that indicates the first priority of the first network for use in determining a communication power for communications from the first node.

Aspect 19: The method of aspect 18, wherein the configuration information further indicates a maximum allowed interference of the one or more other networks, and the communication power is further determined based at least in part on the maximum allowed interference of the one or more other networks.

Aspect 20: The method of any of aspects 16 through 19, wherein the determining the transmission power further comprises: determining a service priority of a data channel to be transmitted to the first node, and wherein the transmission power is further determined based at least in part on the service priority relative to a plurality of service priorities.

Aspect 21: The method of any of aspects 16 through 20, further comprising: configuring the first node to indicate a first network identity of the first network in one or more reference signals transmitted by the first node; identifying at least a first reference signal of the first node based at least in part on the first network identity indicated in the first reference signal; and identifying at least a second reference signal of a second network associated with one or more of the other wireless nodes based at least in part on a second network identity indicated in the second reference signal received at the second node.

Aspect 22: The method of aspect 21, wherein the one or more reference signals include one or more of a remote interference management reference signal (RIM-RS) or an SRS.

Aspect 23: The method of any of aspects 21 through 22, further comprising: determining that the second network has a higher priority than the first network based at least in part on one or more of the first network identity or the second network identity; determining that a signal strength of the second reference signal exceeds a threshold value; and reducing the transmission power for the one or more communications by a set amount based at least in part on the signal strength of the second reference signal and the higher priority of the second network.

Aspect 24: The method of aspect 23, further comprising: refraining from transmitting communications via the shared radio frequency spectrum band when the signal strength of the second reference signal exceeds a set limit.

Aspect 25: The method of any of aspects 23 through 24, further comprising: identifying a plurality of signal strength thresholds, and wherein the reducing the transmission power for the one or more communications is based at least in part on the signal strength of the second reference signal relative to the plurality of signal strength thresholds.

Aspect 26: The method of any of aspects 16 through 22, wherein the determining the transmission power further comprises: determining that a second network has a higher priority than the first network and has a first carrier frequency; reducing the transmission power for the one or more communications by a first reduction amount for communications in a first frequency band that at least partially overlaps the first carrier frequency; reducing the transmission power for the one or more communications by a second reduction amount for communications in a second frequency band that is adjacent to the first carrier frequency; and maintaining a nominal transmission power for the one or more communications in a third frequency band that is outside of a set range of the first carrier frequency.

Aspect 27: The method of any of aspects 16 through 26, wherein the first priority is determined based at least in part on a priority configuration provided by a coexistence manager associated with the first network and the one or more other networks.

Aspect 28: The method of aspect 27, wherein the priority configuration provided by the coexistence manager further indicates a maximum allowed interference of the one or more other networks, and the transmission power for the one or more communications is further determined based at least in part on the maximum allowed interference of the one or more other networks.

Aspect 29: The method of any of aspects 16 through 28, wherein the configuration information further indicates synchronization information for frame synchronization among the first network and the one or more other networks.

Aspect 30: The method of aspect 29, wherein the first priority relative to the one or more other priorities of the one or more other networks is based at least in part on one or more of time resources or frequency resources, and the time resources are determined based at least in part on the synchronization information.

Aspect 31: The method of aspect 30, wherein the transmission power for the one or more communications is reduced for time resources, frequency resources, or combinations thereof, in which the one or more other networks have higher priority than the first network, and the transmission power for the one or more communications is maintained at a nominal level for time resources, frequency resources, or combinations thereof, in which the first network has higher priority than the one or more other networks.

Aspect 32: The method of any of aspects 16 through 31, wherein the determining the transmission power for the one or more communications further comprises: determining that the received signal strength of the one or more other wireless nodes of the one or more other networks is below a threshold value or that a reservation signal from the one or more other networks is undetected; and maintaining a nominal transmission power for the one or more communications irrespective of the first priority relative to the one or more other priorities.

Aspect 33: An apparatus for wireless communication at a first node of a first network, comprising a processor; memory coupled with the processor; and instructions stored in the memory and executable by the processor to cause the apparatus to perform a method of any of aspects 1 through 15.

Aspect 34: An apparatus for wireless communication at a first node of a first network, comprising at least one means for performing a method of any of aspects 1 through 15.

Aspect 35: A non-transitory computer-readable medium storing code for wireless communication at a first node of a first network, the code comprising instructions executable by a processor to perform a method of any of aspects 1 through 15.

Aspect 36: An apparatus for wireless communication at a second node of a first network, comprising a processor; memory coupled with the processor; and instructions stored in the memory and executable by the processor to cause the apparatus to perform a method of any of aspects 16 through 32.

Aspect 37: An apparatus for wireless communication at a second node of a first network, comprising at least one means for performing a method of any of aspects 16 through 32.

Aspect 38: A non-transitory computer-readable medium storing code for wireless communication at a second node of a first network, the code comprising instructions executable by a processor to perform a method of any of aspects 16 through 32.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first node of a first network, comprising:
    receiving configuration information for communicating with a second node of the first network via a shared radio frequency spectrum band, the configuration information including a network identification of the first network and a first priority of the first network relative to one or more other priorities of one or more other networks;
    measuring a received signal strength of one or more reference signals from one or more other wireless nodes of the one or more other networks, wherein the measuring is performed after the receiving the network identification and the first priority, and wherein the one or more reference signals indicate the one or more other priorities; and
    transmitting one or more communications to the second node at a transmission power, wherein the transmission power is determined by the first node based at least in part on the received signal strength of the one or more other wireless nodes and the first priority of the first network.

2. The method of claim 1, further comprising:
    determining a service priority of a data channel to be transmitted to the second node, wherein the transmission power is further determined based at least in part on the service priority relative to a plurality of service priorities.

3. The method of claim 1, wherein:
    the first node is one of a user equipment (UE), a base station, an access point (AP), or a station (STA), and the second node is one of a UE, a base station, an AP, or a STA.

4. The method of claim 1, wherein the configuration information includes a first network identity of the first network that is indicated in one or more additional reference signals transmitted from nodes of the first network, and wherein the method further comprises:
    identifying at least a first reference signal of the one or more additional reference signals from the second node based at least in part on the first network identity indicated in the first reference signal; and
    identifying at least a second reference signal of the one or more reference signals from a second network associated with one or more of the other wireless nodes based at least in part on a second network identity indicated in the second reference signal.

5. The method of claim 4, wherein:
    the one or more reference signals, the one or more additional reference signals, or both include one or more of a remote interference management reference signal (RIM-RS) or a sounding reference signal (SRS).

6. The method of claim 4, further comprising:
    determining that the second network has a higher priority than the first network based at least in part on one or more of the first network identity or the second network identity;
    determining that a signal strength of the second reference signal exceeds a threshold value; and
    reducing the transmission power for the one or more communications by a set amount based at least in part on the signal strength of the second reference signal and the higher priority of the second network.

7. The method of claim 6, further comprising:
    refraining from transmitting communications via the shared radio frequency spectrum band when the signal strength of the second reference signal exceeds a set limit.

8. The method of claim 6, further comprising:
    identifying a plurality of signal strength thresholds, and wherein the reducing the transmission power for the one or more communications is based at least in part on the signal strength of the second reference signal relative to the plurality of signal strength thresholds.

9. The method of claim 1, further comprising:
    determining that a second network has a higher priority than the first network and has a first carrier frequency;
    reducing the transmission power for the one or more communications by a first reduction amount for communications in a first frequency band that at least partially overlaps the first carrier frequency;
    reducing the transmission power for the one or more communications by a second reduction amount for communications in a second frequency band that is adjacent to the first carrier frequency; and
    maintaining a nominal transmission power for the one or more communications in a third frequency band that is outside of a set range of the first carrier frequency.

10. The method of claim 1, wherein the first priority is determined based at least in part on a priority configuration provided by a coexistence manager associated with the first network and the one or more other networks.

11. The method of claim 1, wherein the configuration information further indicates a maximum allowed interference of the one or more other networks, and wherein the transmission power is further determined based at least in part on the maximum allowed interference of the one or more other networks.

12. The method of claim 1, wherein the configuration information further indicates synchronization information for frame synchronization among the first network and the one or more other networks.

13. The method of claim 12, wherein the first priority relative to the one or more other priorities of the one or more other networks is based at least in part on one or more of time resources or frequency resources, and wherein the time resources are determined based at least in part on the synchronization information.

14. The method of claim 13, wherein the transmission power for the one or more communications is reduced for time resources, frequency resources, or combinations thereof, in which the one or more other networks have higher priority than the first network, and the transmission power for the one or more communications is maintained at a nominal level for time resources, frequency resources, or combinations thereof, in which the first network has higher priority than the one or more other networks.

15. The method of claim 1, further comprising:
determining that the received signal strength of the one or more reference signals from the one or more other wireless nodes of the one or more other networks is below a threshold value or that a reservation signal from the one or more other networks is undetected; and
maintaining a nominal transmission power for the one or more communications irrespective of the first priority relative to the one or more other priorities.

16. A method for wireless communication at a second node of a first network, comprising:
identifying configuration information for communications with at least a first node of the first network via a shared radio frequency spectrum band, the configuration information including a network identification of the first network and a first priority of the first network relative to one or more other priorities of one or more other networks;
measuring a received signal strength of one or more reference signals from one or more other wireless nodes of the one or more other networks, wherein the measuring is performed after the identifying the network identification and the first priority, and wherein the one or more reference signals indicate the one or more other priorities; and
transmitting one or more communications to the first node at a transmission power, wherein the transmission power is determined by the first node based at least in part on the received signal strength of the one or more other wireless nodes and the first priority of the first network.

17. The method of claim 16, wherein:
the first node is one of a user equipment (UE), a base station, an access point (AP), or a station (STA), and the second node is one of a UE, a base station, an AP, or a STA.

18. The method of claim 16, further comprising:
transmitting the configuration information to the first node that indicates the first priority of the first network for use in determining a communication power for communications from the first node.

19. The method of claim 18, wherein the configuration information further indicates a maximum allowed interference of the one or more other networks, and
wherein the communication power is further determined based at least in part on the maximum allowed interference of the one or more other networks.

20. The method of claim 16, further comprising:
determining a service priority of a data channel to be transmitted to the first node, wherein the transmission power is further determined based at least in part on the service priority relative to a plurality of service priorities.

21. The method of claim 16, further comprising:
configuring the first node to indicate a first network identity of the first network in one or more additional reference signals transmitted by the first node;
identifying at least a first reference signal of the one or more additional reference signals transmitted by the first node based at least in part on the first network identity indicated in the first reference signal; and
identifying at least a second reference signal of the one or more reference signals from a second network associated with the one or more other wireless nodes based at least in part on a second network identity indicated in the second reference signal received at the second node.

22. The method of claim 21, wherein:
the one or more reference signals, the one or more additional reference signals, or both include one or more of a remote interference management reference signal (RIM-RS) or a sounding reference signal (SRS).

23. The method of claim 21, further comprising:
determining that the second network has a higher priority than the first network based at least in part on one or more of the first network identity or the second network identity;
determining that a signal strength of the second reference signal exceeds a threshold value; and
reducing the transmission power for the one or more communications by a set amount based at least in part on the signal strength of the second reference signal and the higher priority of the second network.

24. The method of claim 23, further comprising:
refraining from transmitting communications via the shared radio frequency spectrum band when the signal strength of the second reference signal exceeds a set limit.

25. The method of claim 23, further comprising:
identifying a plurality of signal strength thresholds, and wherein the reducing the transmission power for the one or more communications is based at least in part on the signal strength of the second reference signal relative to the plurality of signal strength thresholds.

26. The method of claim 16, further comprising:
determining that a second network has a higher priority than the first network and has a first carrier frequency;
reducing the transmission power for the one or more communications by a first reduction amount for communications in a first frequency band that at least partially overlaps the first carrier frequency;
reducing the transmission power for the one or more communications by a second reduction amount for communications in a second frequency band that is adjacent to the first carrier frequency; and
maintaining a nominal transmission power for the one or more communications in a third frequency band that is outside of a set range of the first carrier frequency.

27. The method of claim 16, wherein the first priority is determined based at least in part on a priority configuration provided by a coexistence manager associated with the first network and the one or more other networks.

28. The method of claim 27, wherein the priority configuration provided by the coexistence manager further indicates a maximum allowed interference of the one or more other networks, and wherein the transmission power for the one or more communications is further determined based at least in part on the maximum allowed interference of the one or more other networks.

29. A first node of a first network for wireless communication, comprising:
   one or more memories storing processor-executable code; and
   one or more processors coupled with the one or more memories and individually or collectively operable to execute the code to cause the first node to:
      receive configuration information for communicating with a second node of the first network via a shared radio frequency spectrum band, the configuration information including a network identification of the first network and a first priority of the first network relative to one or more other priorities of one or more other networks;
      measure a received signal strength of one or more reference signals from one or more other wireless nodes of the one or more other networks, wherein the measuring is performed after the receiving the network identification and the first priority, and wherein the one or more reference signals indicate the one or more other priorities; and
      transmit one or more communications to the second node at a transmission power, wherein the transmission power is determined by the first node based at least in part on the received signal strength of the one or more other wireless nodes and the first priority of the first network.

30. A second node of a first network for wireless communication, comprising:
   one or more memories storing processor-executable code; and
   one or more processors coupled with the one or more memories and individually or collectively operable to execute the code to cause the second node to:
      identify configuration information for communications with at least a first node of the first network via a shared radio frequency spectrum band, the configuration information including a network identification of the first network and a first priority of the first network relative to one or more other priorities of one or more other networks;
      measure a received signal strength of one or more reference signals from one or more other wireless nodes of the one or more other networks, wherein the measuring is performed after the identifying the network identification and the first priority, and wherein the one or more reference signals indicate the one or more other priorities; and
      transmit one or more communications to the first node at a transmission power, wherein the transmission power is determined the first node based at least in part on the received signal strength of the one or more other wireless nodes and the first priority of the first network.

* * * * *